US012513406B2

(12) United States Patent
Chien et al.

(10) Patent No.: US 12,513,406 B2
(45) Date of Patent: Dec. 30, 2025

(54) ELECTRONIC DEVICE WITH AUXILIARY LIGHTING FUNCTION AND OPERATION METHOD THEREOF

(71) Applicants: Po-Yang Chien, Taipei (TW); Hao-Jen Fang, Taipei (TW); Wei-Yi Chang, Taipei (TW); Chun-Chieh Chen, Taipei (TW); Chen-Cheng Wang, Taipei (TW); Chih-Wen Chiang, Taipei (TW)

(72) Inventors: Po-Yang Chien, Taipei (TW); Hao-Jen Fang, Taipei (TW); Wei-Yi Chang, Taipei (TW); Chun-Chieh Chen, Taipei (TW); Chen-Cheng Wang, Taipei (TW); Chih-Wen Chiang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 43 days.

(21) Appl. No.: 18/471,303

(22) Filed: Sep. 21, 2023

(65) Prior Publication Data
US 2024/0015403 A1 Jan. 11, 2024

Related U.S. Application Data

(62) Division of application No. 17/314,056, filed on May 7, 2021, now Pat. No. 11,825,202.
(Continued)

(51) Int. Cl.
*H04N 23/72* (2023.01)
*G06F 1/16* (2006.01)
(Continued)

(52) U.S. Cl.
CPC ........... *H04N 23/72* (2023.01); *G06F 1/1684* (2013.01); *G06F 3/04847* (2013.01); *G06F 3/04883* (2013.01)

(58) Field of Classification Search
CPC .... G06F 1/1605; G06F 1/1616; G06F 1/1637; G06F 1/1684; G06F 1/1686;
(Continued)

(56) References Cited

U.S. PATENT DOCUMENTS

| 7,236,154 B1 * | 6/2007 | Kerr | H05B 45/12 |
| | | | 345/169 |
| 9,635,255 B1 | 4/2017 | Baldwin | |

(Continued)

FOREIGN PATENT DOCUMENTS

| CN | 204331543 | | 5/2015 |
| CN | 204331543 U | * | 5/2015 |

(Continued)

OTHER PUBLICATIONS

"Office Action of China Counterpart Application", issued on Jul. 10, 2024, p. 1-p. 8.
(Continued)

*Primary Examiner* — Antoinette T Spinks
(74) *Attorney, Agent, or Firm* — JCIPRNET

(57) ABSTRACT

An electronic device with an auxiliary illumination function and an operation method thereof are provided. The electronic device includes a first body, a display screen, a light-emitting module, and a processing module. The first body has a first surface. The first surface includes a screen area and a border area, and the border area surrounds the screen area. The display screen is disposed in the screen area of the first body. The light-emitting module is disposed in the border area of the first body. The processing module is disposed in the electronic device and is coupled to the display screen and the light-emitting module. The processing module activates the light-emitting module in the border area to emit an auxiliary illumination light according to a required condition.

16 Claims, 17 Drawing Sheets

Related U.S. Application Data

(60) Provisional application No. 63/025,182, filed on May 15, 2020.

(51) Int. Cl.
 *G06F 3/04847* (2022.01)
 *G06F 3/04883* (2022.01)

(58) Field of Classification Search
 CPC ............. G06F 3/04847; G06F 3/04883; G06F 3/04897; H04N 23/611; H04N 23/631; H04N 23/65; H04N 23/72; H04N 23/74
 See application file for complete search history.

(56) References Cited

U.S. PATENT DOCUMENTS

| | | | | |
|---|---|---|---|---|
| 11,763,761 | B2 * | 9/2023 | Chien | .................. G09G 3/3426 345/102 |
| 2011/0317988 | A1 * | 12/2011 | Lee | ........................ G03B 13/34 396/61 |
| 2013/0201653 | A1 | 8/2013 | Shoemake et al. | |
| 2013/0215156 | A1 * | 8/2013 | Li | ........................... G03B 21/14 345/690 |
| 2014/0168937 | A1 * | 6/2014 | Kato | ....................... F21V 14/04 362/23.03 |
| 2019/0213309 | A1 * | 7/2019 | Morestin | ................. G01S 17/04 |
| 2020/0133371 | A1 * | 4/2020 | Chou | .................... G06F 1/3296 |
| 2025/0217002 | A1 * | 7/2025 | Bacim De Araujo E Silva | .......... G06F 3/0487 |
| 2025/0227784 | A1 * | 7/2025 | Balakrishnan | ........ H04W 76/14 |

FOREIGN PATENT DOCUMENTS

CN 108595105 9/2018
TW 200910286 A * 3/2009

OTHER PUBLICATIONS

"Office Action of China Counterpart Application", issued on Nov. 15, 2023, p. 1-p. 8.

* cited by examiner

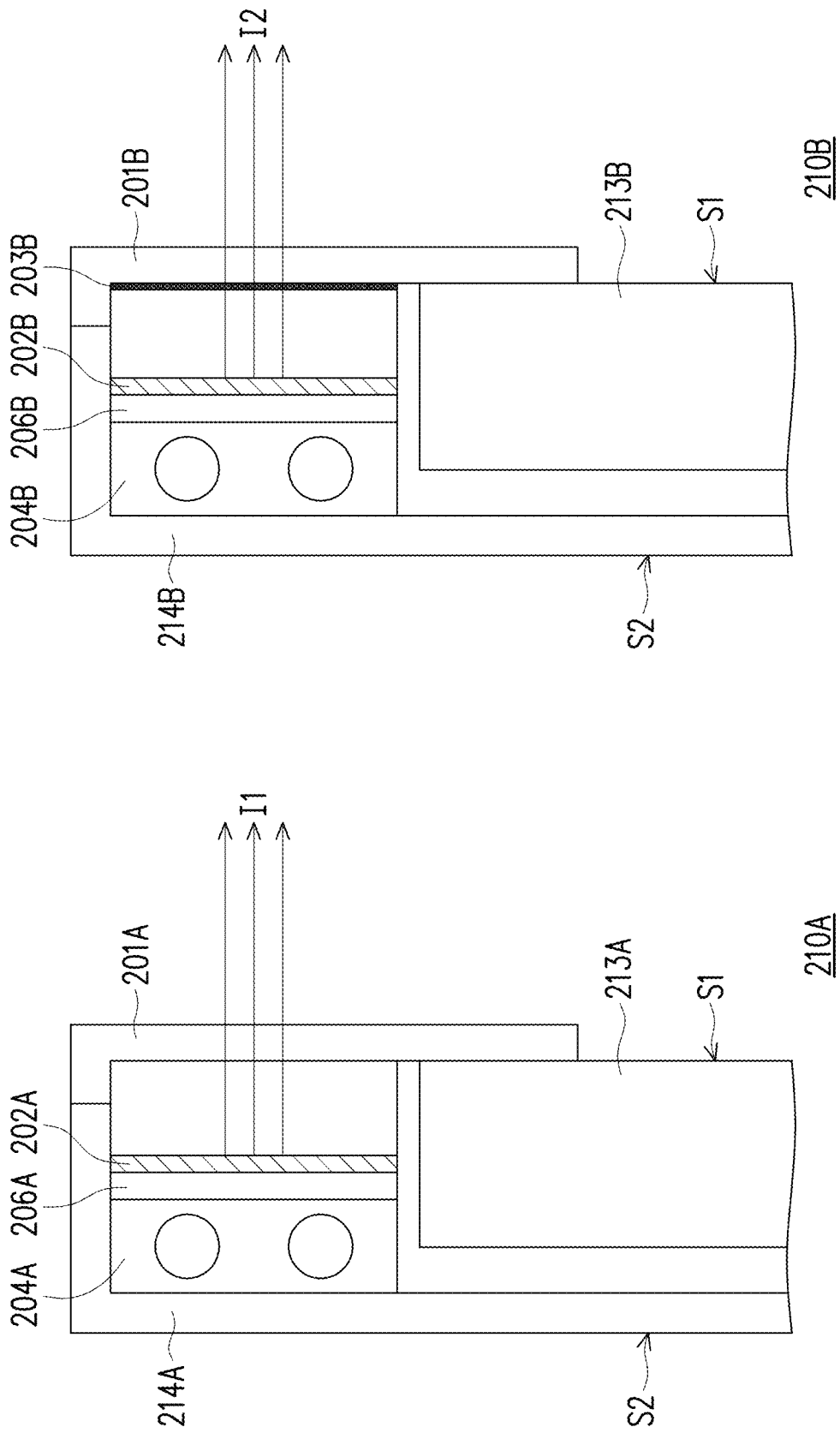

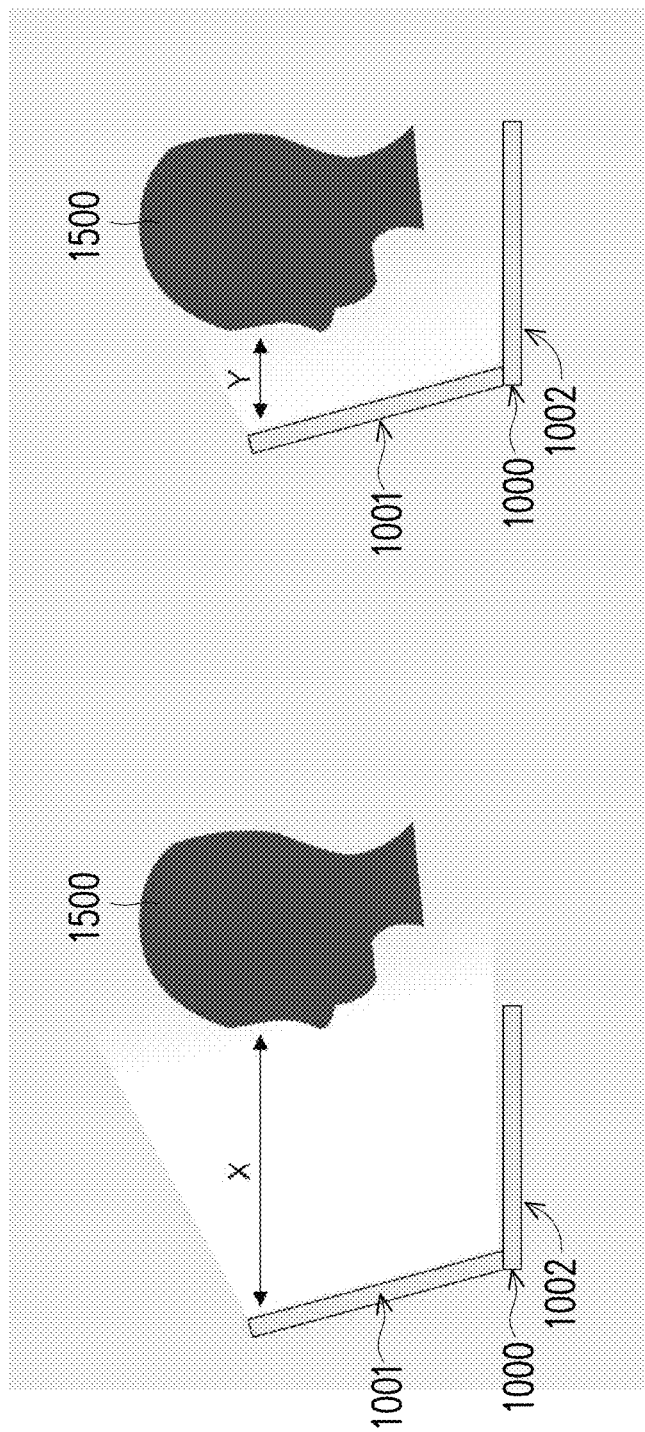

ELECTRONIC DEVICE WITH AUXILIARY LIGHTING FUNCTION AND OPERATION METHOD THEREOF

CROSS-REFERENCE TO RELATED APPLICATION

This application is a divisional application of and claims the priority benefit of U.S. application Ser. No. 17/314,056, filed on May 7, 2021, which claims the priority benefit of U.S. provisional application Ser. No. 63/025,182, filed on May 15, 2020. The entirety of each of the above-mentioned patent applications is hereby incorporated by reference herein and made a part of this specification.

BACKGROUND

Technical Field

The invention relates to an electronic product, and particularly, to an electronic device with an auxiliary lighting function and an operation method thereof.

Description of Related Art

For a general notebook computer, when a user operates the notebook computer to perform an online conference function, and a person image of the user is captured through an image capturing element of the notebook computer, since there may exist a case of insufficient lighting in the current operating environment of the user, image quality of the person image obtained by the image capturing element may be not good as a result. Therefore, the invention proposes solutions in the following embodiments for how to effectively provide auxiliary lighting.

SUMMARY

The invention provides an electronic device with an auxiliary lighting function and an operation method thereof, in which an additional auxiliary illumination light may be automatically provided when a person image is captured.

An electronic device with an auxiliary lighting function of the invention includes a first body, a display screen, a light-emitting module, and a processing module. The first body has a first surface. The first surface includes a screen area and a border area, and the border area surrounds the screen area. The display screen is disposed in the screen area of the first body. The light-emitting module is disposed in the border area of the first body. The processing module is disposed in the electronic device and is coupled to the display screen and the light-emitting module. The processing module activates the light-emitting module in the border area to emit an auxiliary illumination light according to a required condition.

An operation method of the invention is adapted for an electronic device with an auxiliary lighting function. The electronic device includes a first body, a display screen, a light-emitting module, and a processing module. The display screen is disposed in a screen area of the first body. The light-emitting module is disposed in a border area of the first body. The operation method includes the following step. The light-emitting module in the border area is activated to emit an auxiliary illumination light by the processing module according to a required condition.

Based on the foregoing, in the electronic device with an auxiliary lighting function and the operation method thereof of the invention, an additional auxiliary illumination light may be provided through the light-emitting module disposed in the border area around the display screen, which perform appropriate auxiliary lighting for a case of insufficient ambient light (e.g., the face of the user is overly dark).

To make the aforementioned features and advantages of the invention more comprehensible, embodiments accompanied with drawings are described in detail as follows.

BRIEF DESCRIPTION OF THE DRAWINGS

FIG. 2A is a schematic structural diagram of a direct-type light-emitting module of a first embodiment of the invention.

FIG. 2B is a schematic structural diagram of another direct-type light-emitting module of the first embodiment of the invention.

FIG. 14A and FIG. 14B are schematic diagrams of a second operation mode of an embodiment of the invention.

DESCRIPTION OF THE EMBODIMENTS

Figure 1A:
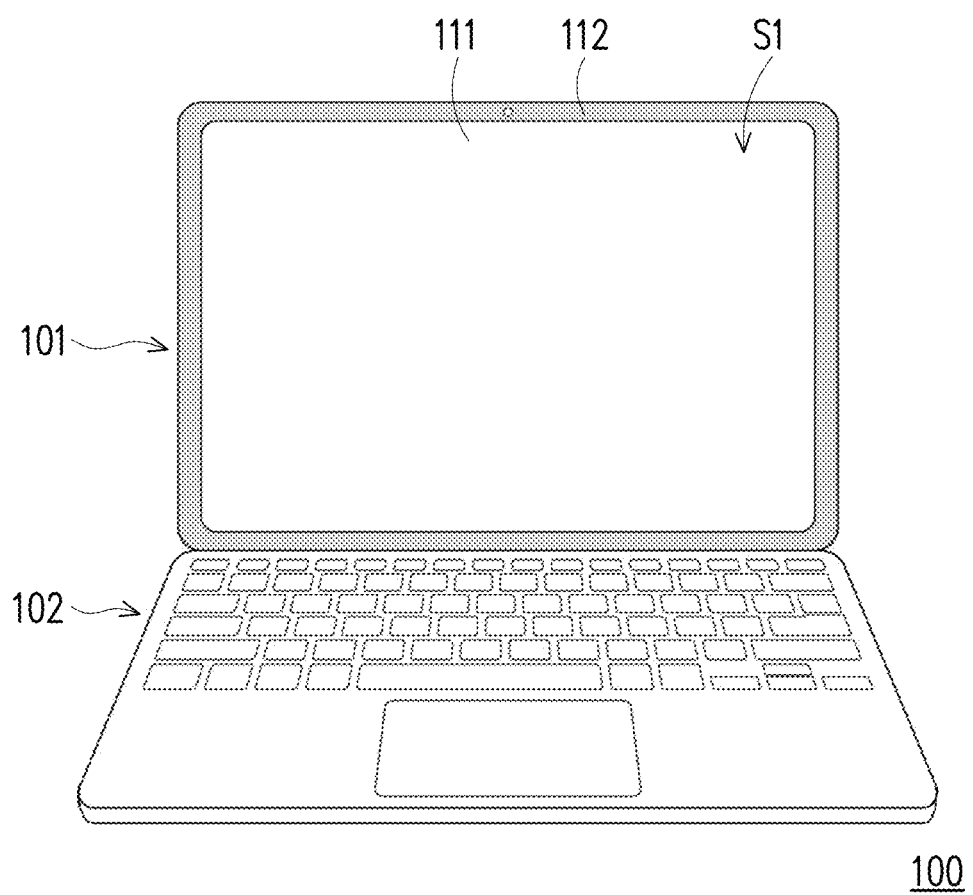
FIG. 1A is a schematic diagram of an electronic device of an embodiment of the invention.

To make the content of the invention more comprehensible, embodiments are provided in the following as examples showing that the disclosure can accordingly be carried out reliably. In addition, wherever possible, elements/members/steps using the same reference numerals in the drawings and the embodiments with reference to the same or similar parts.

FIG. 1A is a schematic diagram of an electronic device of an embodiment of the invention. With reference to FIG. 1A, an electronic device 100 of the invention may be, for example, a notebook computer, but the invention is not limited thereto. In this embodiment, the electronic device 100 includes a first body 101 and a second body 102. One side of the first body 101 is pivotally connected to one side of the second body 102. FIG. 1A shows the open state of the first body 101 and the second body 102. In this embodiment, the first body 101 has a first surface S1 and a second surface. The first surface S1 is located on one side of the first body 101 (e.g., the display side of the notebook computer), and the second surface is located on another side of the first body 101 (e.g., the logo side of the notebook computer). The first surface S1 is parallel to the second surface. In this embodiment, the first surface S1 includes a screen area 111 and a border area 112, and the border area 112 surrounds the screen area 111. A display screen may be disposed in the screen area 111 of the first body 101, and the border area 112 corresponds to a screen border. A light-emitting module may be disposed in the border area 112 of the first body 101. In this embodiment, the light-emitting module may provide an auxiliary illumination light (an auxiliary lighting function) in the border area 112.

Figure 1B:
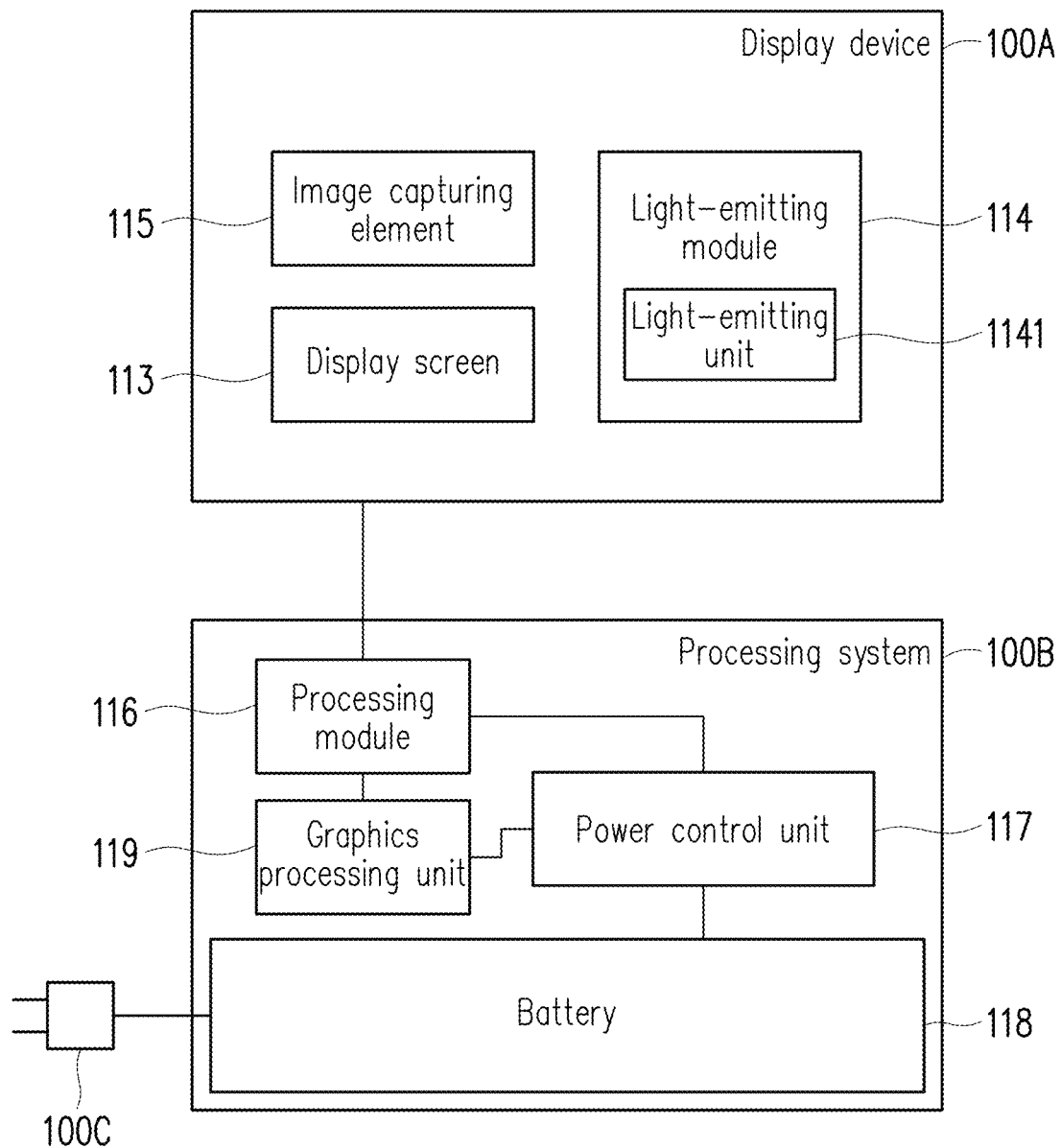
FIG. 1B is a functional block diagram of an electronic device of an embodiment of the invention.

FIG. 1B is a functional block diagram of an electronic device of an embodiment of the invention. With reference to FIG. 1A and FIG. 1B, the electronic device 100 includes a display device 100A and a processing system 100B. The display device 100A may be disposed in the first body 101, and the processing system 100B may be disposed in the second body 102. Nonetheless, the invention is not limited thereto. In some embodiments of the invention, positions in which the display device 100A and the processing system 100B are disposed in the electronic device 100 may be determined according to the type of the electronic device 100. In this embodiment, the display device 100A may include a display screen 113, a light-emitting module 114, an image capturing element 115, a display driving circuit, and an imaging driving circuit. The light-emitting module 114 may include a light-emitting unit 1141 and relevant light-emitting drive circuits, where the light-emitting unit 1141 may include, for example, multiple light-emitting diodes (LEDs). In this embodiment, the processing system 100B may include a processing module 116, a power control unit 117, a battery 118, and a graphics processing unit 119. The processing module 116 is coupled (electrically connected) to the display device 100A, the power control unit 117, and the graphics processing unit 119. The power control unit 117 is coupled to the battery 118 and the graphics processing unit 119. The battery 118 may also be coupled to an external power source through a power plug 100C. The processing module 116 is coupled to and controls the display screen 113, the light-emitting module 114, and the image capturing element 115. The image capturing element 115 may be, for example, a camera.

In the embodiment of FIG. 1B, the processing module 116, for example, may include a central processing unit (CPU) of a notebook computer and/or relevant processing circuits integrated on a motherboard, and may control the display screen 113, the light-emitting module 114, the image capturing element 115, the power control unit 117, and graphics processing unit 119. The power control unit 117 and the graphics processing unit 119 may respectively include a power control circuit and a graphics processing circuit. It is noteworthy that the functional blocks and circuits shown in FIG. 1B may be adopted for implementation of relevant operations described in the embodiments of the invention. In some embodiments of the invention, the power control unit 117 may determine whether the battery charge of the battery 118 is greater than a predetermined charge threshold to perform the auxiliary illumination light described in the embodiments of the invention. Alternatively, the power control unit 117 may determine whether the power plug 100C may receive an external power to perform the auxiliary lighting function described in the embodiments of the invention. In this embodiment, the graphics processing unit 119 is configured to control display screen content of the display screen 113.

Figure 1C:
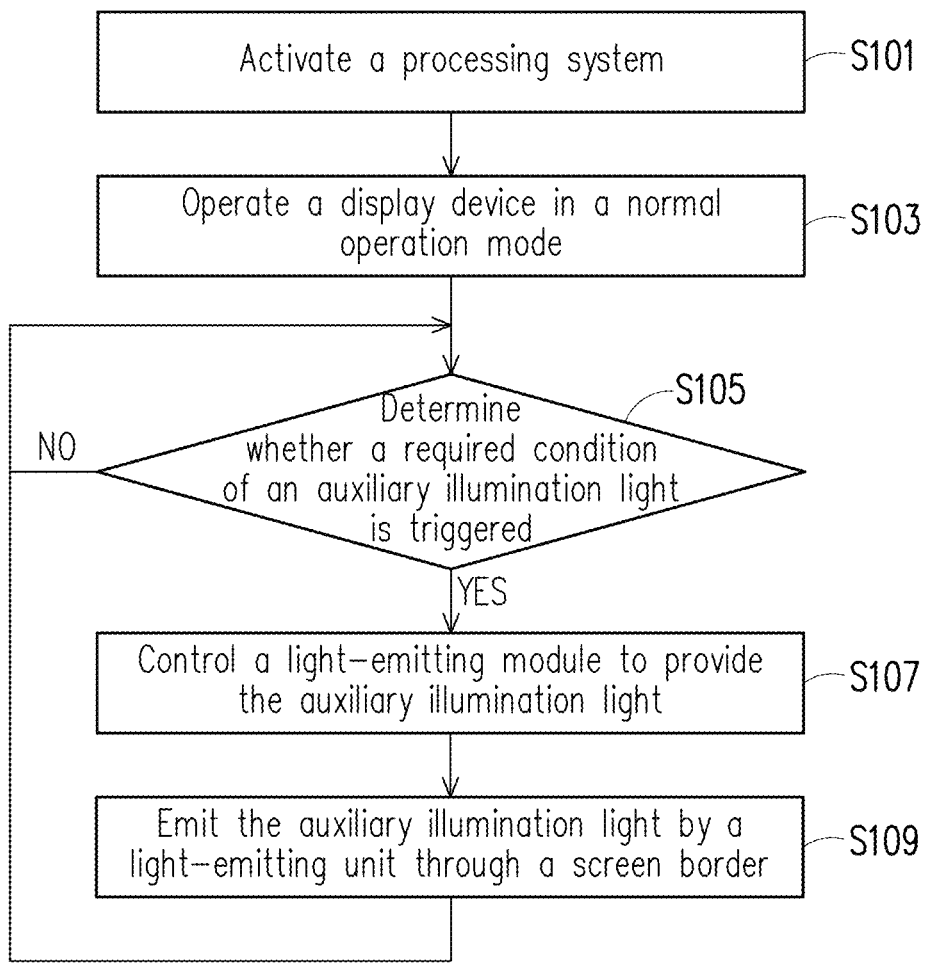
FIG. 1C is a flowchart of an operation method of an embodiment of the invention.

FIG. 1C is a flowchart of an operation method of an embodiment of the invention. With reference to FIG. 1A to FIG. 1C, the processing module 116 of the electronic device 100 may perform following steps S101, S103, S105, S107, and S109. First, a user presses an activating switch of the electronic device 100, such that the first body 101 and the second body 102 of the electronic device 100 enter the open state as shown in FIG. 1A in which they may be operated. Then, in step S101, the processing module 116 activates the processing system 100B of the electronic device 100 (a booting operation). In step S103, the processing module 116 operates a display device in a normal operation mode. In step S105, the processing module 116 determines whether a required condition of an auxiliary illumination light is triggered. If "No" is determined in step S105, the processing module 116 may periodically perform step S105. If "Yes" is determined in step S105, then in step S107, the processing module 116 controls the light-emitting module 114 to provide the auxiliary illumination light. In step S109, the light-emitting module 114 emits the auxiliary illumination light by the light-emitting unit 1141 through the screen border. In this regard, when the electronic device 100 is in circumstances, such as performing a general function, a video conferencing function, a person image capturing function, where sufficient ambient light is required (but the invention is not limited thereto), if there exists a case of insufficient ambient light, the electronic device 100 may perform the above steps to activate the auxiliary illumination light of the screen border. Therefore, in the electronic device 100 and the operation method thereof of the invention, an automatic auxiliary lighting function may be provided.

FIG. 2A is a schematic structural diagram of a direct-type light-emitting module of a first embodiment of the invention. In FIG. 2A, only a partial first body 210A is schematically shown, and the light-emitting module 114 may be implemented as the direct-type light-emitting module as shown in FIG. 2A. In this embodiment, the direct-type light-emitting module includes a screen border 201A, a light-emitting unit 202A, a circuit module 204A, and a light shielding element 206A. The screen border 201A is disposed on the first surface S1 of the first body 210A. The screen border 201A extends from an edge of a display screen 213A to one side of the first body 210A, and is extended on an upper cover 214A of the first body. The upper cover 214A of the first body is extended on a second surface S2 of the first body 210A. An accommodating space is formed between the screen border 201A and the upper cover 214A of the first body 210A. The light-emitting unit 202A, the circuit module 204A, and the light shielding element 206A are disposed in the accommodating space. The light shielding element 206A is disposed on one side opposite to the light-emitting side of the light-emitting unit 202A, and the circuit module 204A is disposed in an accommodating space between a rear side of the light shielding element 206A and the upper cover 214A of the first body 210A. In this embodiment, the light-emitting unit 202A is located behind the screen border 201A and embedded in the first body 210A. In addition, a first side of the light-emitting unit 202A emits an auxiliary illumination light I1 toward the screen border 201A, and a second side of the light-emitting unit 202A is provided with the light shielding element 206A, where the first side is opposite to the second side. It is noteworthy that since the screen border 201A is of a semi-transparent material, the screen border 201A may soften the auxiliary illumination light I1 to provide the auxiliary illumination light I1 with good lighting quality.

FIG. 2B is a schematic structural diagram of another direct-type light-emitting module of the first embodiment of the invention, in which only a partial first body 210B is schematically shown likewise. Similar to the embodiment of FIG. 2A, the direct-type light-emitting module also includes a screen border 201B, a light-emitting unit 202B, a circuit module 204B, and a light shielding element 206B, and the screen border 201B is disposed on the first surface S1 of the first body 210B. The screen border 201B extends from an edge of a display screen 213B to one side of the first body 210B, and is extended on an upper cover 214B of the first body. The upper cover 214B of the first body is extended on the second surface S2 of the first body 210B. The configuration of the screen border 201B, the light-emitting unit 202B, the circuit module 204B, and the light shielding element 206B in FIG. 2B is the same as that in FIG. 2A, and is thus not repeatedly described. The only difference from the embodiment of FIG. 2A is that, in this embodiment, the screen border 201B is of a transparent material, and a semi-transparent coating material 203B is coated on an inner side of the screen border 201B. Therefore, the semi-transparent coating material 203B may soften an auxiliary illumination light I2 to provide the auxiliary illumination light I2 with good lighting quality.

Figures 3A, 3B:
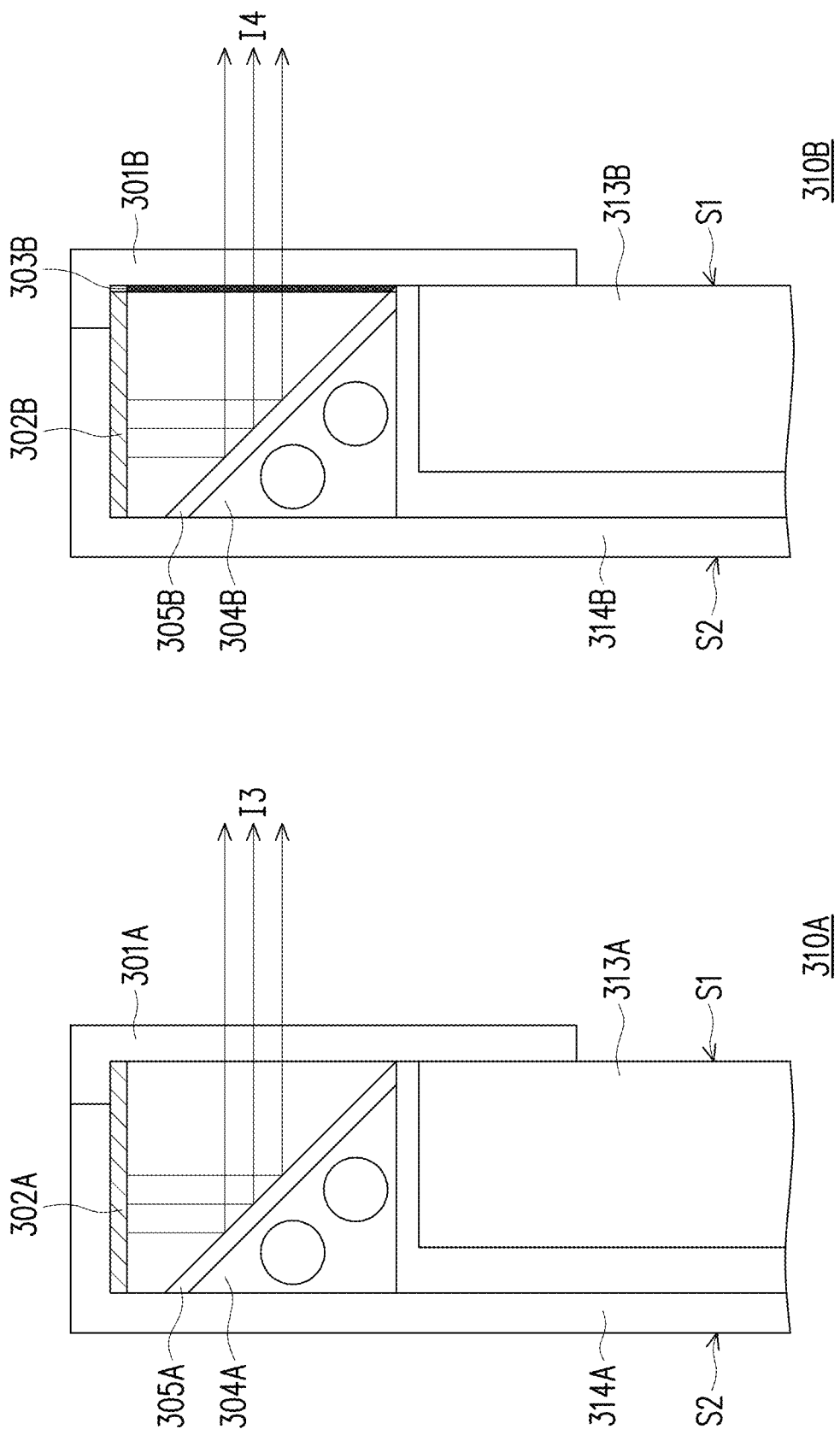
FIG. 3A is a schematic structural diagram of a reflective-type light-emitting module of a second embodiment of the invention.
FIG. 3B is a schematic structural diagram of another reflective-type light-emitting module of the second embodiment of the invention.

FIG. 3A is a schematic structural diagram of a reflective-type light-emitting module of a second embodiment of the invention. In FIG. 3A, only a partial first body 310A is schematically shown, and the light-emitting module 114 may be implemented as the reflective-type light-emitting module as shown in FIG. 3A. In this embodiment, the reflective-type light-emitting module includes a screen border 301A, a light-emitting unit 302A, a circuit module 304A, and a light-reflective element 305A. The screen border 301A is disposed on the first surface S1 of the first body 310A. The screen border 301A extends from an edge of a display screen 313A to one side of the first body 310A, and is extended on an upper cover 314A of the first body. The upper cover 314A of the first body 310A is extended on the second surface S2 of the first body 310A. An accommodating space is formed between the screen border 301A and the upper cover 314A of the first body 310A. The light-emitting unit 302A, the circuit module 304A, and the light-reflective element 305A are disposed in the accommodating space. In this embodiment, the light-emitting unit 302A is located behind the screen border 301A and embedded in the first body 310A. The light-emitting unit 302A is disposed on an inner side top portion of the first body 310A, and emits an auxiliary illumination light I3 toward the light-reflective element 305A, such that the auxiliary illumination light I3 is reflected by the light-reflective element 305A to the screen border 301A. The light-reflective element 305A is obliquely disposed, and an included angle (e.g., an included angle of 15 to 45 degrees) may be present between a reflective surface of the light-reflective element 305A and the inner side top portion of the first body 310A or the light-emitting unit 302A. The circuit module 304A is disposed in an accommodating space between a rear side of the light-reflective element 305A and the display screen 313A. It is noteworthy that since the screen border 301A is of a semi-transparent material, the screen border 301A may soften the auxiliary illumination light I3 to provide the auxiliary illumination light I3 with good lighting quality.

FIG. 3B is a schematic structural diagram of another reflective-type light-emitting module of the second embodiment of the invention, in which only a partial first body 310B is schematically shown likewise. Similar to the embodiment of FIG. 3A, in this embodiment, the reflective-type light-emitting module also includes a screen border 301B, a light-emitting unit 302B, a circuit module 304B, and a light-reflective element 305B, and the screen border 301B is disposed on the first surface S1 of the first body 310B. The screen border 301B extends from an edge of a display screen 313B to one side of the first body 310B, and is extended on an upper cover 314B of the first body 310B. The upper cover 314B of the first body 310B is extended on the second surface S2 of the first body 310B. In FIG. 3B, the configuration of the screen border 301B, the light-emitting unit 302B, the circuit module 304B, and the light-reflective element 305B is the same as in FIG. 3A, and is thus not repeatedly described. The only difference from the embodiment of FIG. 3A is that, in this embodiment, the screen border 301B is of a transparent material, and a semi-transparent coating material 303B is coated on an inner side of the screen border 301B. Therefore, the semi-transparent coating material 303B may soften an auxiliary illumination light I4 to provide the auxiliary illumination light I4 with good lighting quality.

Figure 4:
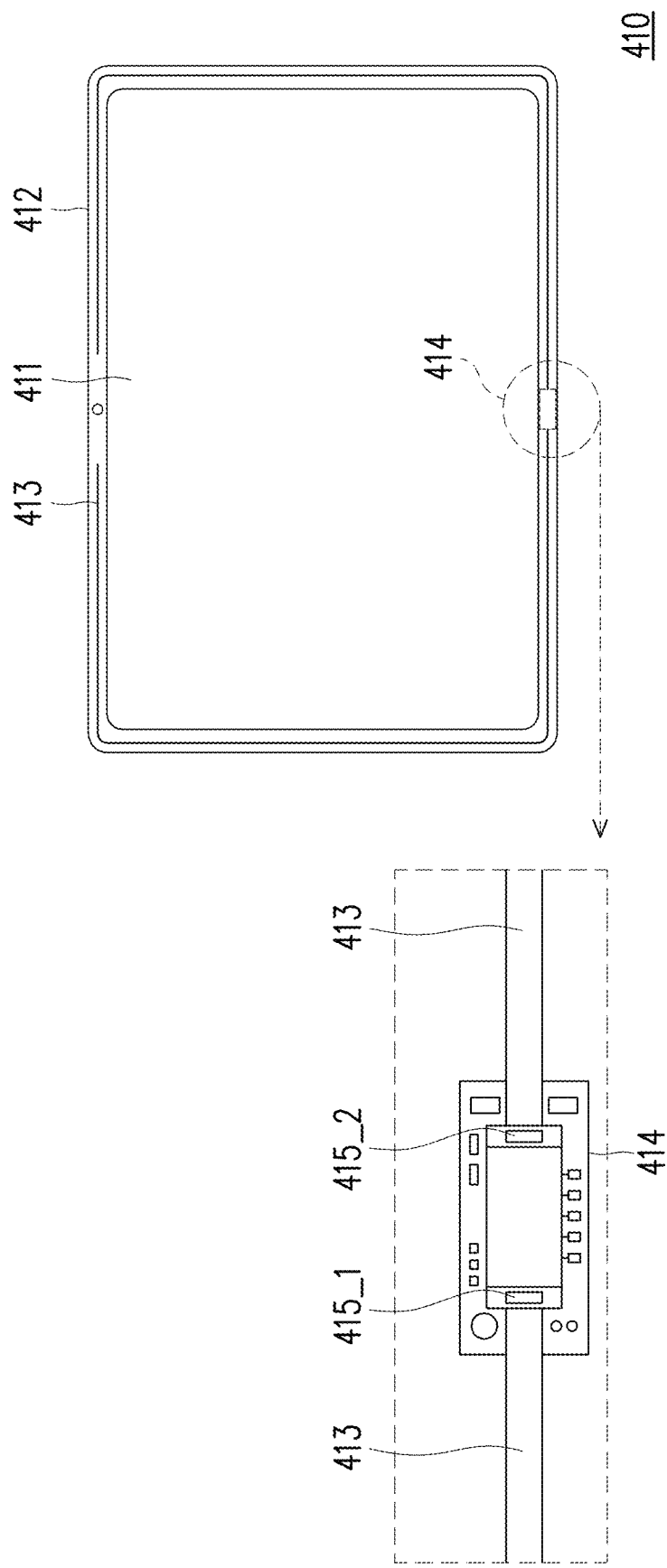
FIG. 4 is a schematic structural diagram of a light-emitting module of a third embodiment of the invention.

FIG. 4 is a schematic structural diagram of a light-emitting module of a third embodiment of the invention, and the light-emitting module 114 may be implemented as a light-guide type light-emitting module as shown in FIG. 4. In this embodiment, the light-emitting module includes a light guide bar 413 and a control panel 414. The light guide bar 413 is disposed along a border area 412, and the border area 412 surrounds a screen area 411. The control panel 414 is coupled to two ends of the light guide bar 413. The control panel 414 includes a first light-emitting unit 415_1 and a second light-emitting unit 415_2, and the first light-emitting unit 415_1 and the second light-emitting unit 415_2 disposed on the control panel 414 respectively emit light toward the two ends of the light guide bar 413. Therefore, the border area 412 of the embodiment may emit an auxiliary illumination light with uniform illumination quality.

Figure 5A:
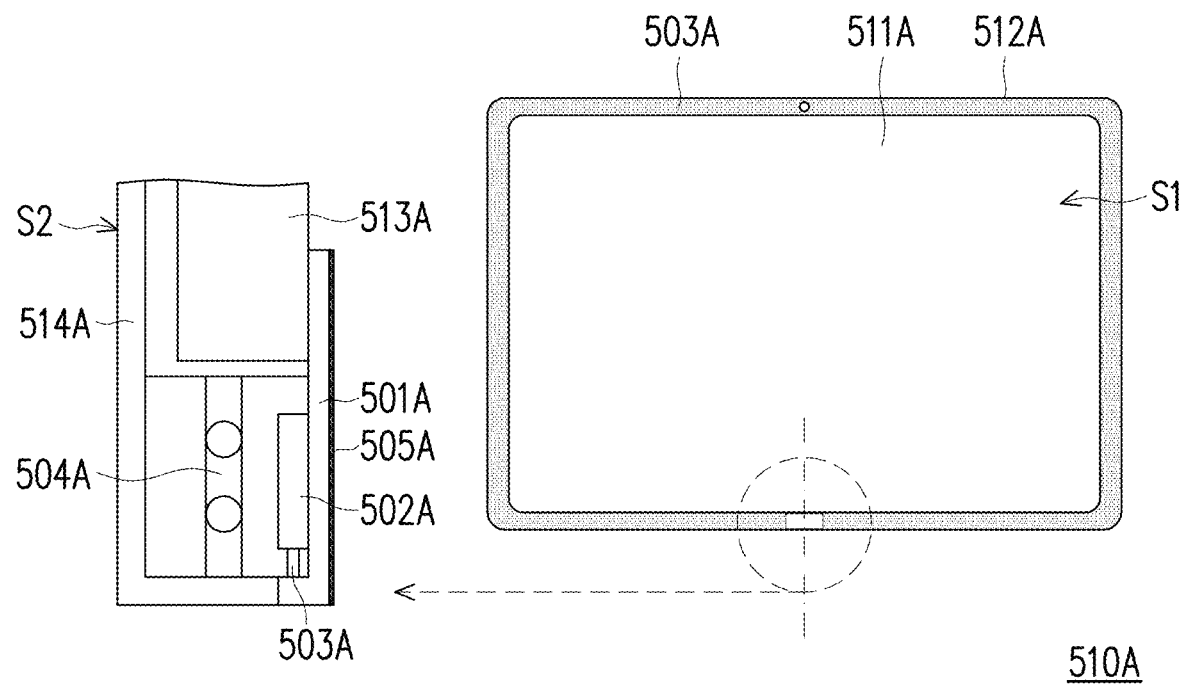
FIG. 5A is a schematic structural diagram of a light-emitting module of a fourth embodiment of the invention.

FIG. 5A is a schematic structural diagram of a light-emitting module of a fourth embodiment of the invention, and the light-emitting module 114 may be implemented as an electroluminescent-type light-emitting module as shown in FIG. 5A. A first body 510A includes a screen area 511A and a border area 512A, and the border area 512A surrounds the screen area 511A. In this embodiment, the light-emitting module includes a screen border 501A, a metal conductor 502A, a conductive wire 503A, a control panel 504A, and a nano light-emitting coating material 505A. The screen border 501A is disposed on the first surface S1 of the first body 510A. The screen border 501A extends from an edge of a display screen 513A to one side of the first body 510A, and is extended on an upper cover 514A of the first body 510A. The upper cover 514A of the first body 510A is extended on the second surface S2 of the first body 510A. An accommodating space is formed between the screen border 501A and the upper cover 514 of the first body 510. The metal conductor 502A, the conductive wire 503A, and the control panel 504A are disposed in the accommodating space. In this embodiment, the metal conductor 502A is disposed along the border area 512A and is disposed on an inner side of the screen border 501A. The conductive wire 503A is coupled to the metal conductor 502A. The control panel 504A is coupled to the conductive wire 503A. It is noteworthy that the nano light-emitting coating material 505A is coated on an outer side of the screen border 501A. The control panel 504A provides electrical energy through the conductive wire 503A and the metal conductor 502A to the nano light-emitting coating material 505A. Therefore, the border area 512A of the embodiment may emit an auxiliary illumination light with uniform illumination quality.

Figure 5B:
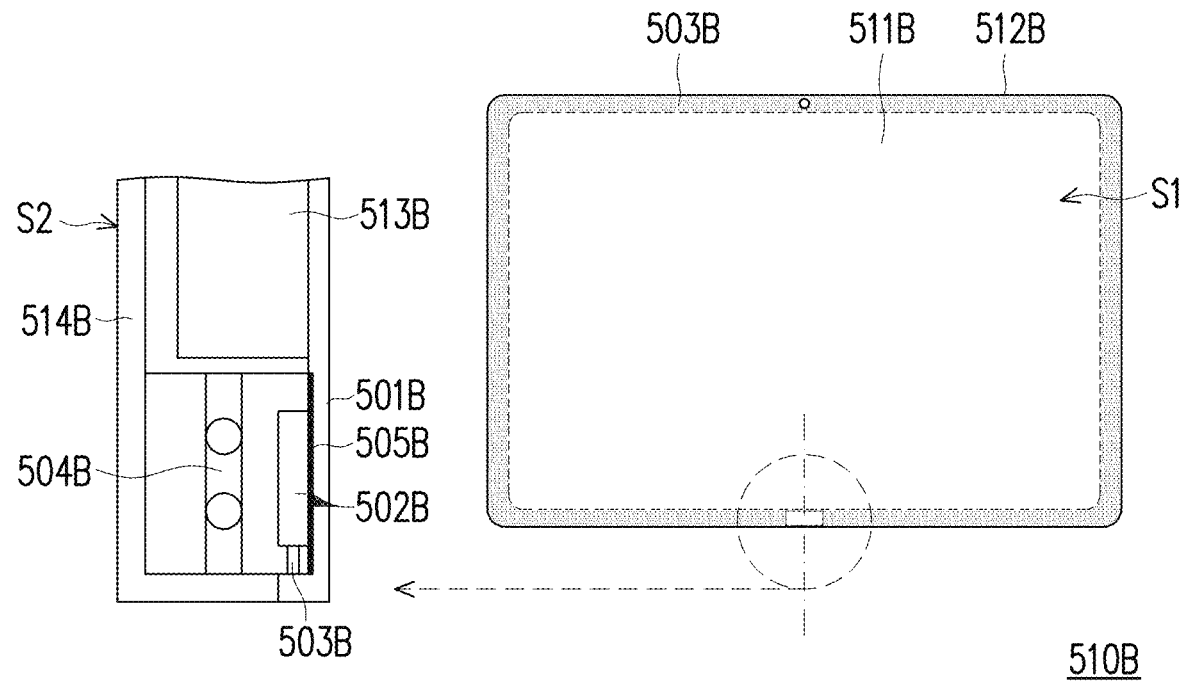
FIG. 5B is a schematic structural diagram of another light-emitting module of the fourth embodiment of the invention.

FIG. 5B is a schematic structural diagram of another light-emitting module of the fourth embodiment of the invention, an the light-emitting module 114 may be implemented as an electroluminescent-type light-emitting module as shown in FIG. 5B. A first body 510B includes a screen area 511B and a border area 512B, and the border area 512B surrounds the screen area 511B. Similar to the embodiment of FIG. 5A, in this embodiment, the light-emitting module also includes a screen border 501B, a metal conductor 502B, a conductive wire 503B, a control panel 504B, and a nano light-emitting coating material 505B. In this embodiment, the configuration of the screen border 501B, the metal conductor 502B, the conductive wire 503B, and the control panel 504B is the same as that in FIG. 5A, and is thus not repeatedly described. The only difference from the embodiment of FIG. 5A is that, in this embodiment, the nano light-emitting coating material 505B is coated on an inner side of the screen border 501B. Therefore, the control panel 504B similarly provides electrical energy through the conductive wire 503B and the metal conductor 502B to the nano light-emitting coating material 505B, such that the border area 512B may emit an auxiliary illumination light with uniform illumination quality.

Figure 6A:
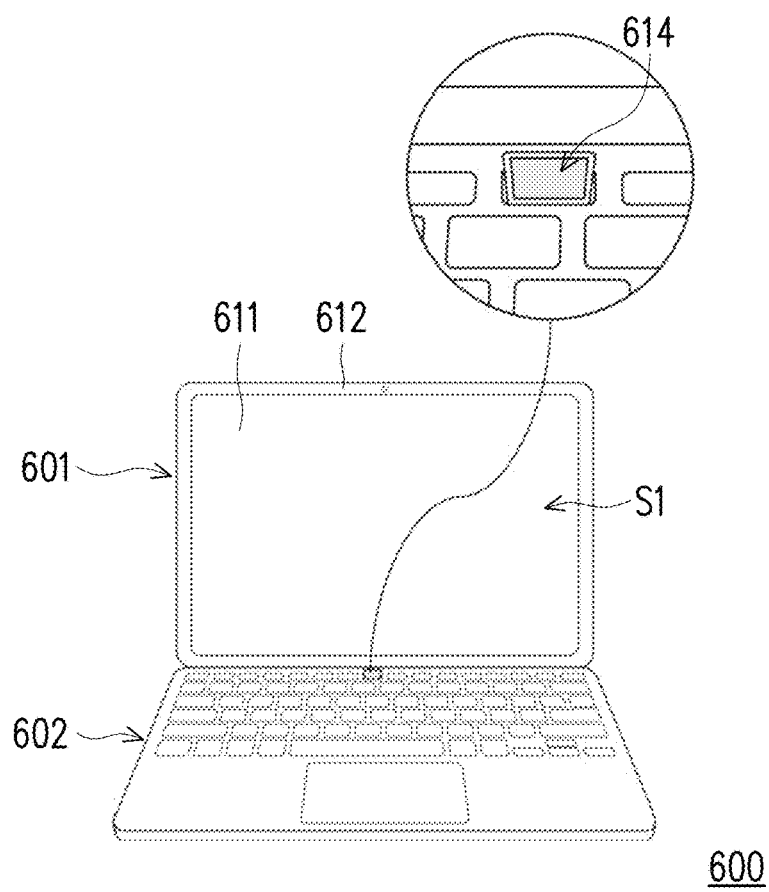
FIG. 6A to FIG. 6C are schematic structural diagrams of another light-emitting module of the invention.
Figure 6B:
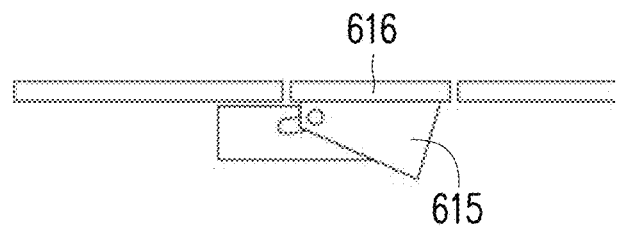
Figure 6C:
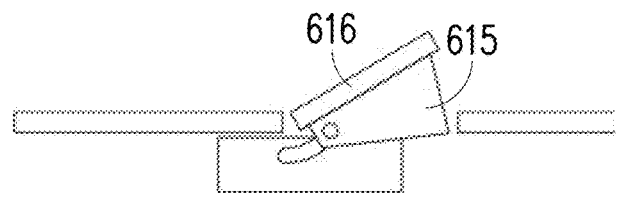

FIG. 6A to FIG. 6C are schematic structural diagrams of another light-emitting module of the invention. With reference to FIG. 6A to FIG. 6C, an electronic device 600 includes a first body 601 and a second body 602. One side of the first body 601 is pivotally connected to one side of the second body 602. The first surface S1 of the first body 601 includes a screen area 611 and a border area 612, and the border area 612 surrounds the screen area 611. A display screen may be disposed in the screen area 611 of the first body 601. A light-emitting module may be disposed in the border area 612 of the first body 601. For other technical features of the electronic device 600 of this embodiment, reference may be made to the description of the embodiments of FIG. 1A to FIG. 5B, which is not repeatedly described here. In this embodiment, the second body 602 of the electronic device 600 may include a keyboard module and another light-emitting module 614. The light-emitting module 614 may be integrated into the keyboard module. The light-emitting module 614 includes a lifting/lowering structure 615 and a light-emitting unit 616. The light-emitting unit 616 is disposed on the lifting/lowering structure 615. In this embodiment, when the lifting/lowering structure 615 is operated in a lowered state (as shown in FIG. 6B), the light-emitting unit 616 is turned off, and when the lifting/lowering structure 615 is operated in a lifted state (as shown in FIG. 6C), the light-emitting unit 616 emits another auxiliary illumination light. Therefore, when the light-emitting module in the border area 612 of the first body 601 and the light-emitting module of the second body 602 are simultaneously activated, the electronic device 600 may provide an auxiliary illumination light with sufficient brightness.

Figure 7A:
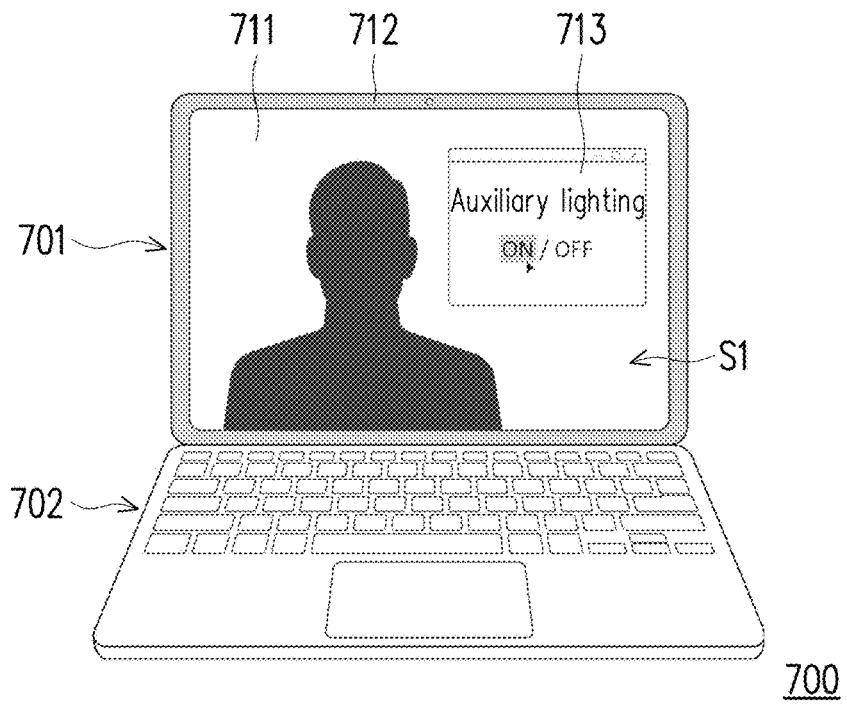
FIG. 7A is a schematic diagram of switching an auxiliary lighting function of an embodiment of the invention.

FIG. 7A is a schematic diagram of switching an auxiliary lighting function of an embodiment of the invention. With reference to FIG. 7A, an electronic device 700 includes a first body 701 and a second body 702. One side of the first body 701 is pivotally connected to one side of the second body 702. The first surface S1 of the first body 701 includes a screen area 711 and a border area 712, and the border area 712 surrounds the screen area 711. A display screen may be disposed in the screen area 711 of the first body 701. A light-emitting module may be disposed in the border area 712 of the first body 701. For other technical features of the electronic device 700 of this embodiment, reference may be made to the description of the embodiments of FIG. 1A to FIG. 5B, which is not repeatedly described herein. In this embodiment, a processing module of the electronic device 700 may drive the display screen to display an adjustment interface 713, and takes a setting result corresponding to the adjustment interface 713 as a required condition for activating an auxiliary illumination light in the border area 712. To be specific, with reference to FIG. 1B and FIG. 7A in combination, the user may control display screen content of the display screen through the mouse, keyboard or touch. There exists an application icon in the display screen content, allowing the user to click on, and then the processing module triggers the adjustment interface 713 to appear on the display screen. Therefore, the user may determine whether the auxiliary illumination light in the border area 712 is set to ON or set to OFF in the setting result of the adjustment interface 713.

Figure 7B:
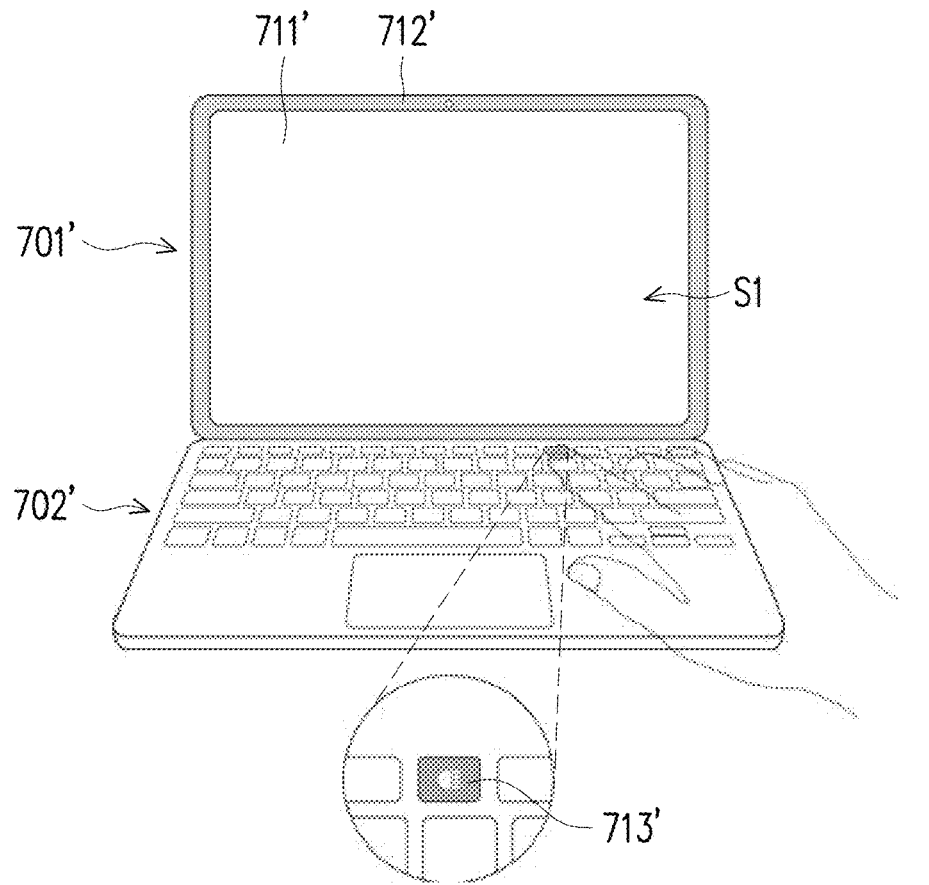
FIG. 7B is a schematic diagram of switching an auxiliary lighting function of another embodiment of the invention.

FIG. 7B is a schematic diagram of switching an auxiliary lighting function of another embodiment of the invention. With reference to FIG. 7B, an electronic device 700' includes a first body 701' and a second body 702'. One side of the first body 701' is pivotally connected to one side of the second body 702'. The first surface S1 of the first body 701' includes a screen area 711' and a border area 712', and the border area 712' surrounds the screen area 711'. A display screen may be disposed in the screen area 711' of the first body 701'. A light-emitting module may be disposed in the border area 712' of the first body 701'. For other technical features of the electronic device 700' of this embodiment, reference may be made to the description of the embodiments of FIG. 1A to FIG. 5B, which is not repeatedly described herein. In this embodiment, the second body 702' includes a switch unit 713'. The switch unit 713' is coupled to a processing module and configured to provide an enable signal. The enable signal may serve as a required condition for activating an auxiliary illumination light in the border area 712'. In this embodiment, the user may manually switch the switch unit 713' to output the enable signal to the processing module to activate the auxiliary illumination light in the border area 712'.

Figure 8A:
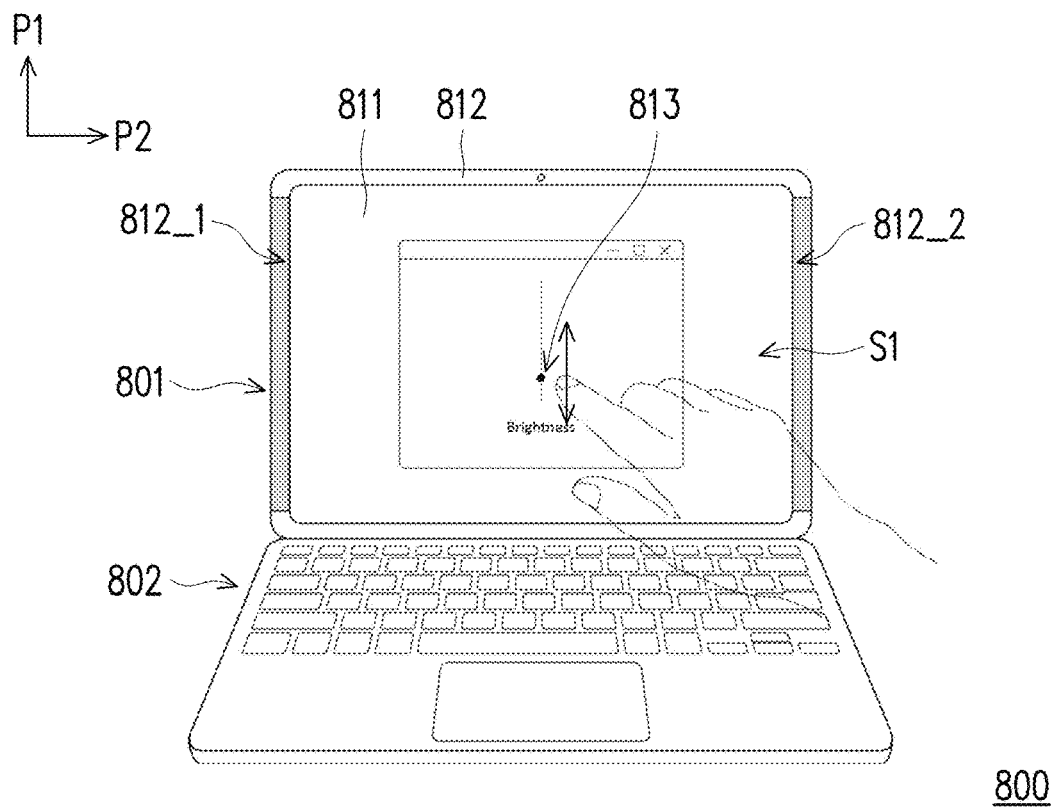
FIG. 8A is a schematic diagram of an operation interface for adjusting an auxiliary lighting function of an embodiment of the invention.
Figure 8B:
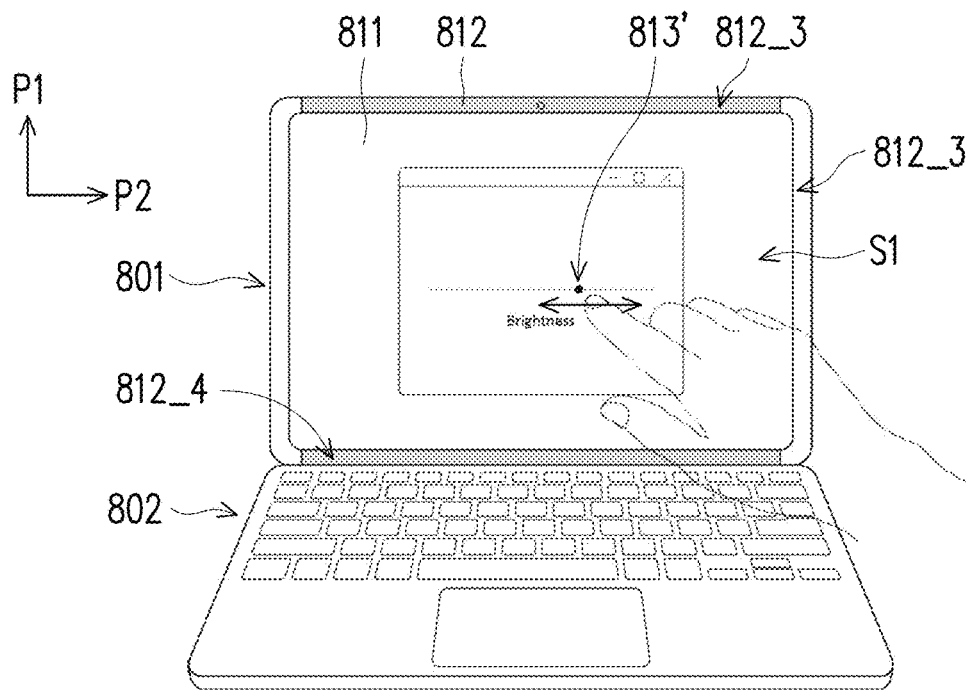
FIG. 8B is a schematic diagram of an operation interface for adjusting an auxiliary lighting function of another embodiment of the invention.

FIG. 8A is a schematic diagram of an operation interface for adjusting an auxiliary lighting function of an embodiment of the invention. FIG. 8B is a schematic diagram of an operation interface for adjusting an auxiliary lighting function of another embodiment of the invention. With reference to FIG. 8A first, an electronic device 800 includes a first body 801 and a second body 802. One side of the first body 801 is pivotally connected to one side of the second body 802. The first surface S1 of the first body 801 includes a screen area 811 and a border area 812, and the border area 812 surrounds the screen area 811. A display screen may be disposed in the screen area 811 of the first body 801. A light-emitting module may be disposed in the border area 812 of the first body 801. For other technical features of the electronic device 800 of this embodiment, reference may be made to the description of the embodiments of FIG. 1A to FIG. 5B, which is not repeatedly described herein. In this embodiment, the display screen may be a touch display screen.

It is noteworthy that, in the invention, brightness of portions 812_1 and 812_2 of the light-emitting module in the border area 812 extended along a first direction P1 may be correspondingly changed according to adjustment of a first virtual adjustment button 813 displayed on the touch display screen, and the first virtual adjustment button 813 is adapted to correspondingly adjust a position according to a touch gesture in the first direction P1. Next, with reference to FIG. 8B, brightness of portions 812_3 and 812_4 of the light-emitting module in the border area 812 extended along a second direction P2 may be correspondingly changed according to adjustment of a second virtual adjustment button 813' displayed on the touch display screen, and the second virtual adjustment button 813' is adapted to correspondingly adjust a position in the second direction P2 according to another touch gesture.

Figure 8C:
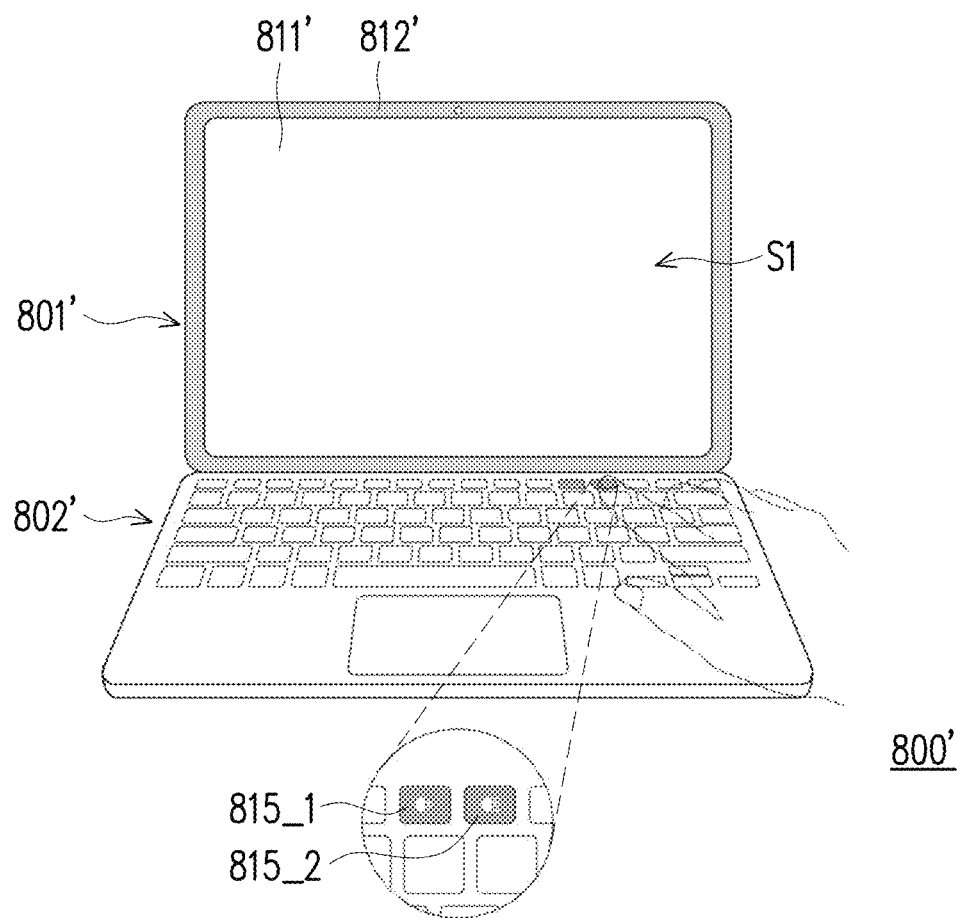
FIG. 8C is a schematic diagram of adjusting an auxiliary lighting function of still another embodiment of the invention.

FIG. 8C is a schematic diagram of adjusting an auxiliary lighting function of still another embodiment of the invention. With reference to FIG. 8C, an electronic device 800' includes a first body 801' and a second body 802'. One side of the first body 801' is pivotally connected to one side of the second body 802'. The first surface S1 of the first body 801' includes a screen area 811' and a border area 812', and the border area 812' surrounds the screen area 811'. A display screen may be disposed in the screen area 811' of the first body 801'. A light-emitting module may be disposed in the border area 812' of the first body 801'. For other technical features of the electronic device 800' of this embodiment, reference may be made to the description of the embodiments of FIG. 1A to FIG. 5B, which is not repeatedly described herein. In this embodiment, the second body 802' may include adjustment units 815_1 and 815_2. The adjustment units 815_1 and 815_2 are coupled to a processing module and may provide at least two adjustment signals. Therefore, the processing module of this embodiment adjusts brightness of an auxiliary illumination light provided by the light-emitting module according to the at least two adjustment signals.

Figure 9:
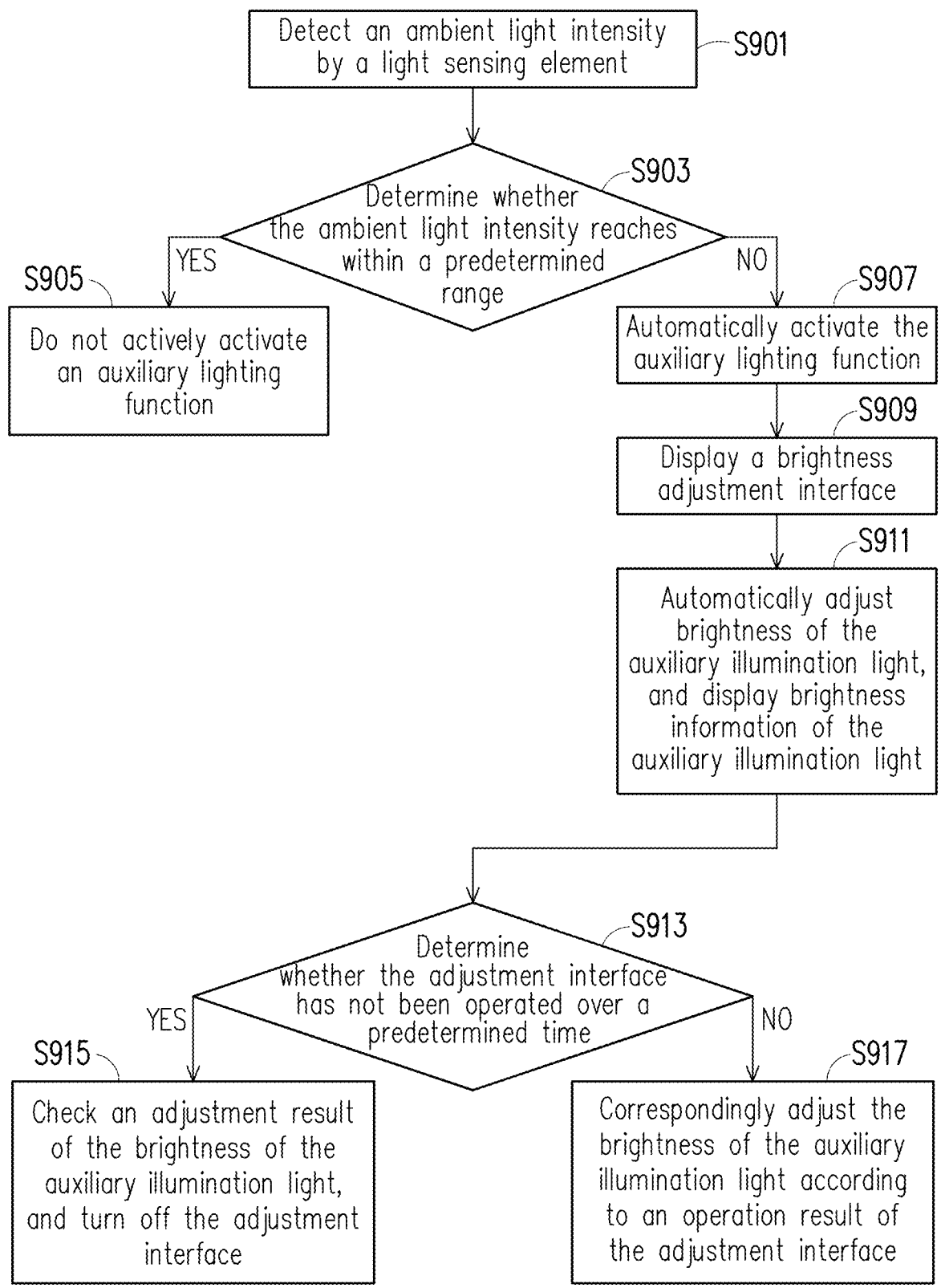
FIG. 9 is a flowchart of automatically adjusting illumination light of an embodiment of the invention.
Figure 10:
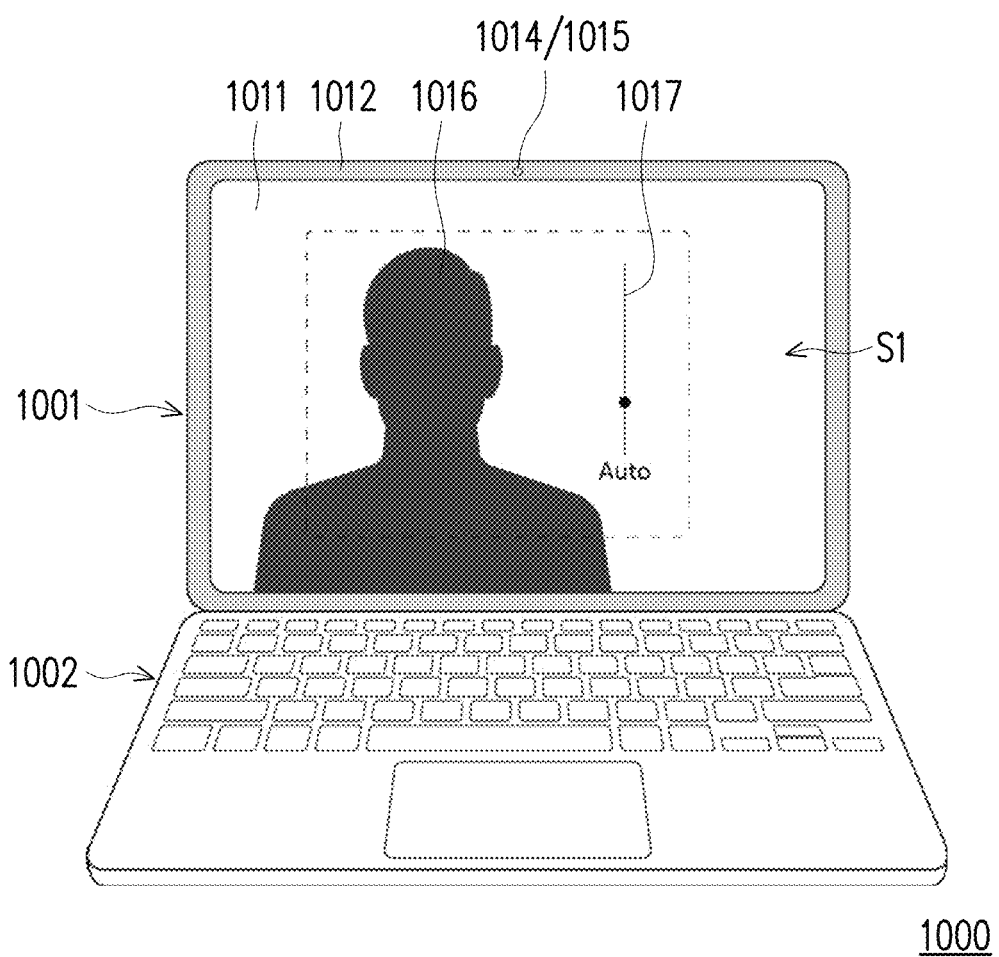
FIG. 10 is a schematic diagram of automatically adjusting illumination light of an embodiment of the invention.

FIG. 9 is a flowchart of automatically adjusting illumination light of an embodiment of the invention. FIG. 10 is a schematic diagram of automatically adjusting illumination light of an embodiment of the invention. With reference to FIG. 9 and FIG. 10, an electronic device 1000 includes a first body 1001 and a second body 1002. One side of the first body 1001 is pivotally connected to one side of the second body 1002. The first surface S1 of the first body 1001 includes a screen area 1011 and a border area 1012, and the border area 1012 surrounds the screen area 1011. A display screen may be disposed in the screen area 1011 of the first body 1001. A light-emitting module may be disposed in the border area 1012 of the first body 1001. For other technical features of the electronic device 1000 of this embodiment, reference may be made to the description of the embodiments of FIG. 1A to FIG. 5B, which is not repeatedly described herein. In this embodiment, the electronic device 1000 may also include a light sensing element 1014. The light sensing element 1014 may be disposed in the border area 1012 and coupled to a processing module.

As shown in FIG. 9 to FIG. 10, the processing module may determine whether an ambient light intensity obtained by the light sensing element 1014 is greater than a threshold, to serve as a required condition for whether to activate an auxiliary illumination light in the border area 1012. In addition, the processing module also determines whether the ambient light intensity reaches within a range of a sensing interval to serve as a required condition for activating the auxiliary illumination light. Specifically, when the ambient light intensity does not reach within the range of the sensing interval, after determining the same, the processing module automatically activates the auxiliary illumination light, and displays a brightness adjustment interface 1017 by the display screen to present current lighting intensity information of the light-emitting module by the brightness adjustment interface 1017. When the ambient light intensity reaches within the range of the sensing interval, the processing module turns off the auxiliary illumination light. In other words, in a case of relatively low ambient light intensity or failure to provide appropriate background brightness, the processing module may automatically activate the auxiliary illumination light. It should be noted that after the brightness adjustment interface 1017 presents the current lighting intensity information, the processing module may be further switched to the touch adjustment means and the interface there as described in FIG. 8A and FIG. 8B above for the user to operate. Alternatively, the user directly presses the adjustment means of the physical button as described in FIG. 8C above.

With reference to FIG. 9, the processing module of the electronic device 1000 may perform following steps S901 to S917 to realize automatically activating the auxiliary lighting function as mentioned above. In step S901, the electronic device 1000 may detect an ambient light intensity by the light sensing element 1014. In step S903, the electronic device 1000 may determine whether the ambient light intensity reaches within a predetermined range (i.e., "whether the ambient light intensity is greater than a threshold" or "whether the ambient light intensity reaches within the range of the sensing interval" as mentioned above). If yes, in step S905, the electronic device 1000 does not actively activate the auxiliary lighting function. If not, in step S907, the electronic device 1000 may automatically activate the auxiliary lighting function. In step S909, the electronic device 1000 may display the brightness adjustment interface 1017. In step S911, the electronic device 1000 may automatically adjust brightness of the auxiliary illumination light, and may display brightness information of the auxiliary illumination light by the brightness adjustment interface 1017. In step S913, the electronic device 1000 may determine whether the adjustment interface 1017 has not been operated over a predetermined time. If yes, in step S915, the electronic device 1000 may check an adjustment result of the brightness of the auxiliary illumination light, and turn off the adjustment interface 1017. In addition, the electronic device 1000 may next perform step S901. If not, in step S917, the electronic device 1000 may correspondingly adjust the brightness of the auxiliary illumination light according to an operation result of the adjustment interface 1017, and the electronic device 1000 may next perform step S913. Therefore, the electronic device 1000 of this embodiment may not only automatically adjust the brightness of the auxiliary illumination light, but also allow the user to perform manual adjustment.

Figure 11:
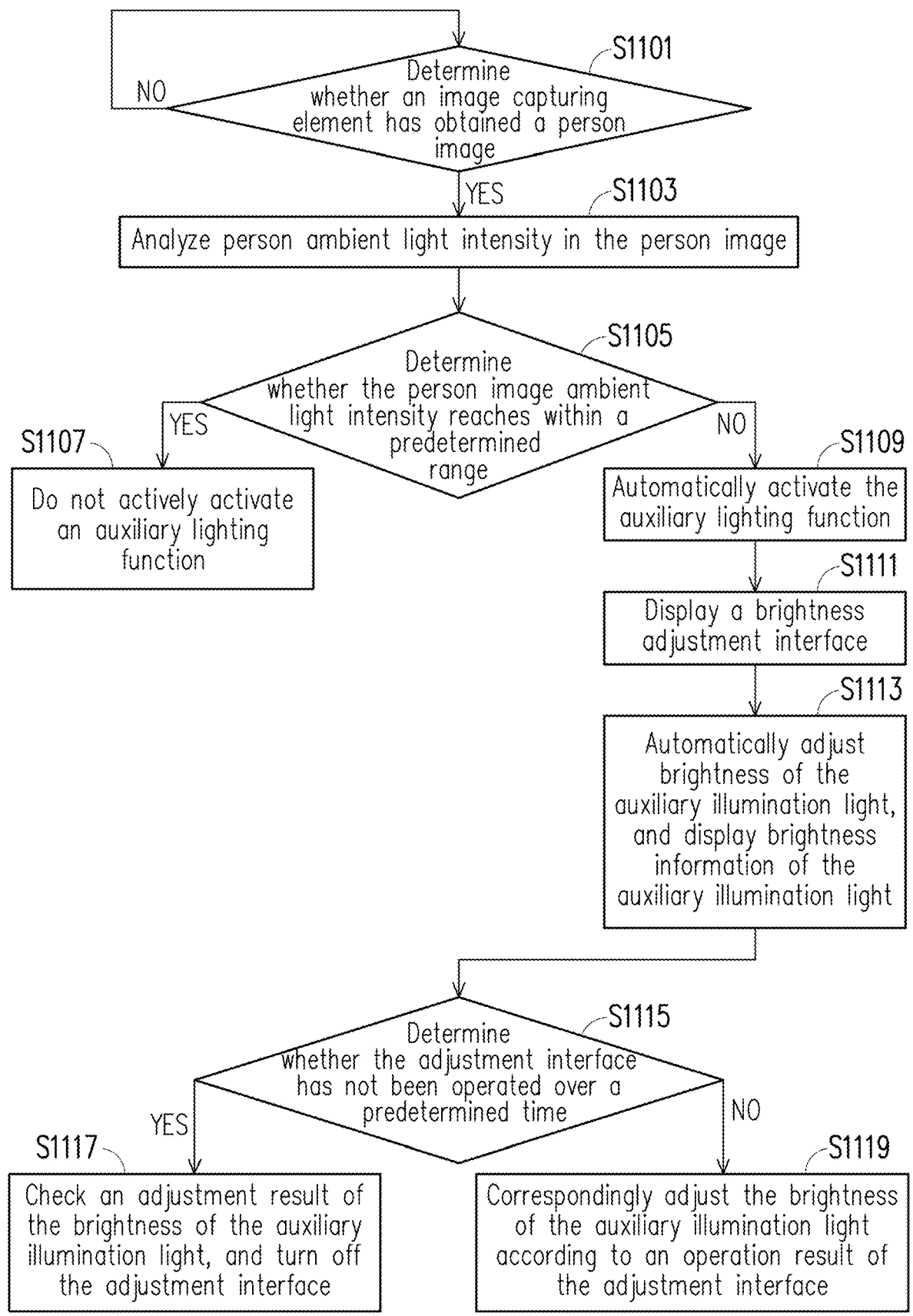
FIG. 11 is a flowchart of automatically adjusting illumination light of another embodiment of the invention.

FIG. 11 is a flowchart of automatically adjusting illumination light of another embodiment of the invention. With reference to FIG. 10 and FIG. 11, in this embodiment, the electronic device 1000 may also include an image capturing element 1015 (e.g., the image capturing element 115 of FIG. 1B). The image capturing element 1015 may be disposed in the border area 1012 and coupled to a processing module. In this embodiment, the electronic device 1000 may also determine an ambient light intensity, through analyzing whether a person image ambient light intensity of a person image 1016 captured by the image capturing element 1015 reaches within a predetermined range, to serve as a required condition for whether to activate an auxiliary illumination light. Specifically, when the person image ambient light intensity does not reach within the predetermined range, the processing module activates the auxiliary illumination light, and displays current lighting intensity information of a light-emitting module by a display screen (e.g., the brightness adjustment interface 1017 as shown in FIG. 10). When the person image ambient light intensity reaches within the predetermined range, the processing module turns off the auxiliary illumination light. In other words, in a case of relatively low person image ambient light intensity or absence of appropriate background brightness, the processing module may automatically activate the auxiliary illumination light.

With reference to FIG. 11, the processing module of the electronic device 1000 may perform following steps S1101 to S1119 to realize automatically activating the auxiliary lighting function as mentioned above. In step S1101, the electronic device 1000 may determine whether the image capturing element 1015 has obtained the person image 1016. If not, the electronic device 1000 may perform step S1101 again after a predetermined time interval. If yes, in step S1103, the electronic device 1000 may analyze the person ambient light intensity in the person image 1016. In step S1105, the electronic device 1000 may determine whether the person image ambient light intensity reaches within the predetermined range. If yes, in step S1107, the electronic device 1000 does not actively activate the auxiliary lighting function. If not, in step S1109, the electronic device 1000 may automatically activate the auxiliary lighting function. In step S1111, the electronic device 1000 may display the brightness adjustment interface 1017. In step S1113, the electronic device 1000 may automatically adjust brightness of the auxiliary illumination light, and may display brightness information of the auxiliary illumination light by the brightness adjustment interface 1017. In step S1115, the electronic device 1000 may determine whether the adjustment interface 1017 has not been operated over a predetermined time (absent manual adjustment by the user). If yes, in step S1117, the electronic device 1000 may check an adjustment result of the brightness of the auxiliary illumination light, and turn off the adjustment interface 1017. In addition, the electronic device 1000 may next perform step S1101. If not, in step S1119, the electronic device 1000 may correspondingly adjust the brightness of the auxiliary illumination light according to an operation result of the adjustment interface 1017, and the electronic device 1000 may next perform step S1115. Therefore, the electronic device 1000 of this embodiment may not only automatically adjust the brightness of the auxiliary illumination light, but also allow the user to perform manual adjustment.

Figure 12:
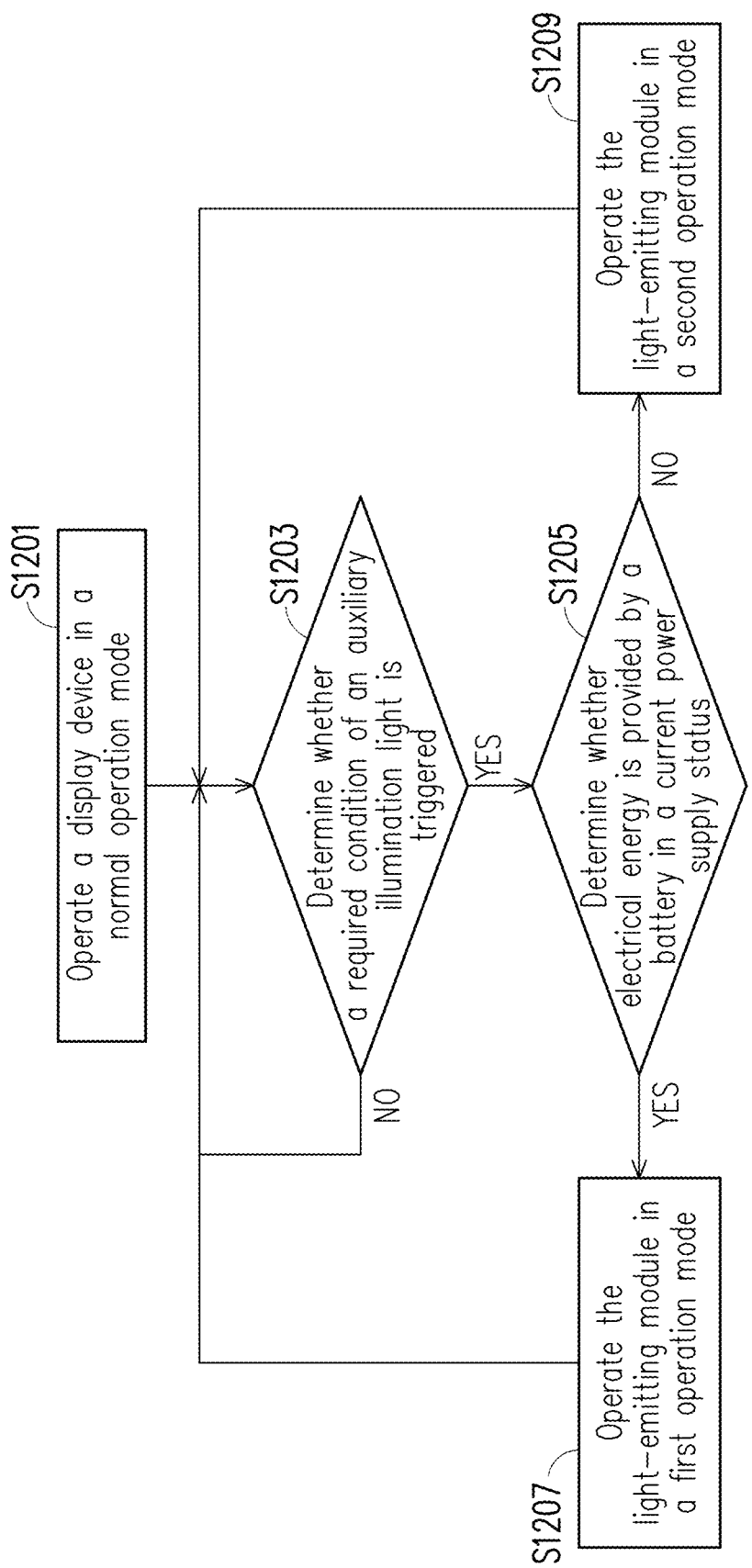
FIG. 12 is a flowchart of automatically adjusting illumination light of still another embodiment of the invention.
Figure 13:
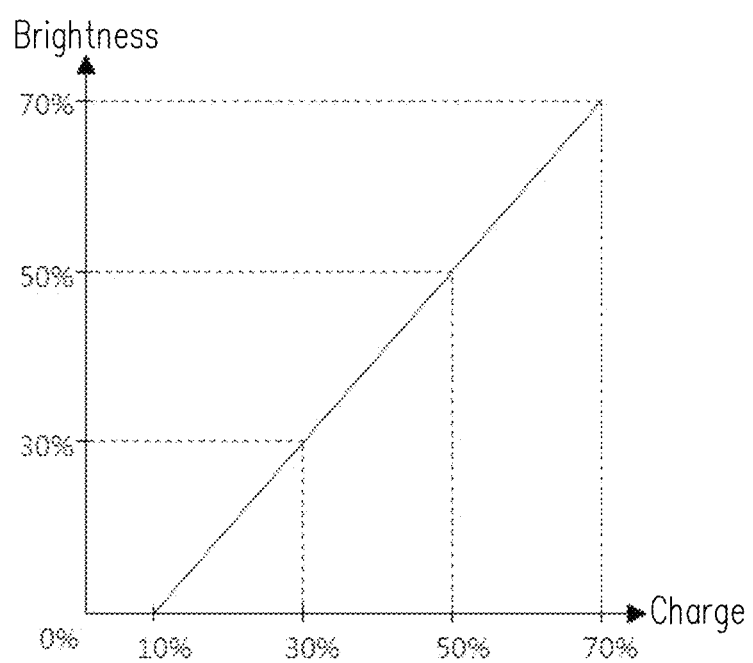
FIG. 13 is a schematic diagram of a first operation mode of an embodiment of the invention.

FIG. 12 is a flowchart of automatically adjusting illumination light of still another embodiment of the invention. FIG. 13 is a schematic diagram of a first operation mode of an embodiment of the invention. FIG. 14A and FIG. 14B are schematic diagrams of a second operation mode of an embodiment of the invention. With reference to FIG. 12 to FIG. 14B, the electronic device 1000 may perform following steps S1201 to S1209 to realize the function of automatically adjusting an auxiliary illumination light. In step S1201, the electronic device 1000 may operate a display device in a normal operation mode. When the electronic device 1000 is activated, a light-emitting module of the electronic device 1000 may be turned off. In step S1203, the electronic device 1000 may determine whether a required condition of the auxiliary illumination light is triggered. In this regard, for the required condition of the auxiliary illumination light, one of the conditions in the embodiments (as shown in FIG. 7A, FIG. 7B, FIG. 9, and FIG. 11) may be selected. If not, then the electronic device 1000 may next perform step S1201 again after a predetermined time interval. If yes, in step S1205, the electronic device 1000 may determine whether electrical energy is provided by a battery (e.g., the battery 118 in FIG. 1B) in a current power supply status. If the electronic device 1000 is provided with electrical energy by a battery, the electronic device 1000 performs step S1207 to operate the light-emitting module in a first operation mode. If the electronic device 1000 is provided with electrical energy by a power plug (e.g., the power plug 100C of FIG. 1B), then the electronic device 1000 performs step S1209 to operate the light-emitting module in a second operation mode.

With reference to FIG. 13, in this embodiment, the first operation mode refers to that a processing module may determine whether battery charge is greater than a predetermined value (e.g., 10% of charge) to dynamically adjust brightness of the auxiliary illumination light provided by the light-emitting module. In this embodiment, the processing module may dynamically adjust the brightness of the auxiliary illumination light according to the amount of battery charge. The amount of battery charge is proportional to the brightness of the auxiliary illumination light. For example, as shown in FIG. 13, if the battery charge is lower than 100% and higher than 50% (i.e., the charge is between 50% to 100%), then the processing module dynamically adjusts the brightness of the auxiliary illumination light provided by the light-emitting module to be higher than 50%. If the battery charge is higher than 10% and lower than 50% (or the charge is between 10% and 50%), then the processing module dynamically adjusts the brightness of the auxiliary illumination light provided by the light-emitting module to be lower than 50%. In addition, if the battery charge is lower than 10%, then the processing module turns off the light-emitting module to prevent exhaustion of charge and ensure that the electronic device 1000 may continue to be operated in a case of minimum charge. Besides, in some other embodiment of the invention, when the processing module determines that the battery charge is higher than 10%, the processing module may also consider the ambient light intensity and/or the person ambient light intensity described in the above embodiments to dynamically adjust the brightness of the auxiliary illumination light. Therefore, the electronic device 1000 of this embodiment may automatically adjust the brightness of the auxiliary illumination light when being powered by the battery.

With reference to FIG. 14A and FIG. 14B, the second operation mode of this embodiment refers to that the processing module may determine the distance between a user 1500 and the first body 1001 of the electronic device 1000, and the distance may be obtained by utilizing the image capturing element 1015 (having a distance detection function) or an additionally disposed distance sensor. The distance is proportional to the brightness of the auxiliary illumination light. For example, as shown in FIG. 14A, when the electronic device 1000 determines that electrical energy provided is by a power plug in the current power supply status, the electronic device 1000 senses a distance (X) between the user 1500 and the first body 1001 of the electronic device 1000. In this regard, since the distance (X) is relatively long, the processing module may dynamically adjust the brightness of the auxiliary illumination light provided by the light-emitting module to be greater. Comparatively, as shown in FIG. 14B, the electronic device 1000 senses a distance (Y) between the user 1500 and the first body 1001 of the electronic device 1000. In this regard, since the distance (Y) is relatively short, the processing module may dynamically adjust the brightness of the auxiliary illumination light provided by the light-emitting module to be less. Therefore, the electronic device 1000 of this embodiment may automatically adjust the brightness of the auxiliary illumination light when being powered by the power plug.

In summary of the foregoing, in the electronic device with an auxiliary lighting function and the operation method thereof of the invention, the light-emitting module in the border area may be automatically activated to emit an auxiliary illumination light according to the required condition, and the required condition of the invention may be, for example, at least one of the adjustment result of the adjustment interface (FIG. 7A), the switching result of the switch element (FIG. 7B), or the determined result of the ambient light intensity (FIG. 9) or the person ambient light intensity (FIG. 11). In addition, in the electronic device with an auxiliary lighting function and the operation method thereof of the invention, the function of dynamically adjusting the brightness of the auxiliary illumination light is also present for the user to have a good user experience during the process of operations, such as a video conference, on the electronic device.

Although the invention has been disclosed in the above embodiments, the embodiments are not intended to limit the invention. It will be apparent to persons skilled in the art that some modifications and variations can be made without departing from the spirit or scope of the invention. In view of the above, the scope of protection of the invention depends on the scope defined by the appended claims.

What is claimed is:

1. An electronic device with an auxiliary lighting function, comprising:
    a first body, having a first surface, wherein the first surface comprises a screen area and a border area, and the border area surrounds the screen area;
    a display screen, disposed in the screen area of the first body;
    a light-emitting module, disposed in the border area of the first body; and
    a processing module, disposed in the electronic device, and coupled to the display screen and the light-emitting module; and
    a light sensing element, coupled to the processing module, wherein the processing module activates the light-emitting module in the border area to emit an auxiliary illumination light surrounding the screen area according to whether a required condition is triggered, wherein the required condition comprises:
        determining, by the processing module, whether an ambient light intensity obtained by the light sensing element is greater than a threshold to serve as the required condition of whether to activate the auxiliary illumination light,
        determining, by the processing module, whether the ambient light intensity reaches within a range of a sensing interval to serve as the required condition of whether to activate the auxiliary illumination light,
    wherein the processing module activates the auxiliary illumination light and the display screen displays current lighting intensity information of the light-emitting module when the ambient light intensity does not reach within the range of the sensing interval,
    wherein the processing module turns off the auxiliary illumination light when the ambient light intensity reaches within the range of the sensing interval,
    wherein the processing module determines whether electrical energy of the electronic device is provided by a battery or a power plug,
    wherein when the electrical energy is provided by the power plug in a current power supply status, the processing module adjusts the auxiliary illumination light dynamically based on a distance between a user and the first body, wherein:
        the processing module adjusts a brightness of the auxiliary illumination light to be greater when the distance is relatively long, and
        the processing module adjusts the brightness of the auxiliary illumination light to be less when the distance is relatively short,
    wherein the display screen is a touch display screen,
    wherein brightness of a portion of the light-emitting module extended along a first direction in the border area is correspondingly changed according to adjustment of a first virtual adjustment button displayed on the touch display screen, wherein a position of the first virtual adjustment button is adapted to be correspondingly adjusted in the first direction according to a touch gesture,
    wherein brightness of a portion of the light-emitting module extended along a second direction in the border area is correspondingly changed according to adjustment of a second virtual adjustment button displayed on the touch display screen, wherein a position of the second virtual adjustment button is adapted to be correspondingly adjusted in the second direction according to another touch gesture.

2. The electronic device as described in claim 1, wherein the light-emitting module comprises:
    a screen border, disposed on the first surface of the first body, wherein the screen border is of a semi-transparent material, or the screen border is of a transparent material and is coated with a semi-transparent coating material; and
    a light-emitting unit, located behind the screen border and embedded in the first body.

3. The electronic device as described in claim 2, wherein the light-emitting module is a direct-type light-emitting module, a first side of the light-emitting unit emits the auxiliary illumination light toward the screen border, and a second side of the light-emitting unit is provided with a light shielding element, wherein the first side is opposite to the second side.

4. The electronic device as described in claim 2, wherein the light-emitting module is a reflective-type light-emitting module, the light-emitting unit is disposed on an inner side top portion of the first body, and emits the auxiliary illumination light toward a light-reflective element, such that the auxiliary illumination is reflected by the light-reflective element to the screen border.

5. The electronic device as described in claim 2, wherein the light-emitting module comprises a direct-type light-emitting module and a reflective-type light-emitting module, at least one portion of the border area is provided with the direct-type light-emitting module, and at least another portion of the border area is provided with the reflective-type light-emitting module.

6. The electronic device as described in claim 1, wherein the light-emitting module further comprises:
   a light guide bar, disposed along the border area; and
   a control panel, coupled to two ends of the light guide bar, wherein a first light-emitting unit and a second light-emitting unit disposed on the control panel respectively emit light toward the two ends of the light guide bar.

7. The electronic device as described in claim 1, wherein the light-emitting module further comprises:
   a metal conductor, disposed along the border area, and disposed on an inner side of the screen border;
   a conductive wire, coupled to the metal conductor; and
   a control panel, coupled to the conductive wire,
   wherein the light-emitting unit is a nano light-emitting coating material and is coated on an outer side or an inner side of the screen border, wherein the control panel provides electrical energy through the conductive wire and the metal conductor to the nano light-emitting coating material.

8. The electronic device as described in claim 1, wherein the processing module is configured to drive the display screen to display an adjustment interface, and takes a setting result corresponding to the adjustment interface as the required condition for activating the auxiliary illumination light.

9. The electronic device as described in claim 1, further comprising:
   a second body, having one side pivotally connected to one side of the first body, and comprising a switch unit, wherein the switch unit is coupled to the processing module and configured to provide an enable signal, and the enable signal is taken as the required condition for activating the auxiliary illumination light.

10. The electronic device as described in claim 1, further comprising:
    a second body, having one side pivotally connected to one side of the first body, and comprising at least two adjustment units, wherein the at least two adjustment units are coupled to the processing module, and configured to provide at least two adjustment signals,
    wherein the processing module adjusts brightness of the auxiliary illumination light provided by the light-emitting module according to the at least two adjustment signals.

11. The electronic device as described in claim 1, further comprising:
    a battery control unit, coupled to the processing module, the display screen, and the light-emitting module,
    wherein the processing module dynamically adjusts an auxiliary illumination light provided by the light-emitting module according to battery charge information provided by the battery control unit.

12. An operation method, adapted for an electronic device with an auxiliary lighting function, wherein the electronic device comprises a first body, a display screen, a light-emitting module, a processing module, and a light sensing element, the display screen is disposed in a screen area of the first body, and the light-emitting module is disposed in a border area of the first body, and wherein the operation method comprises:
    activating, by the processing module, the light-emitting module in the border area to emit an auxiliary illumination light surrounding the screen area according to whether a required condition is triggered, wherein the required condition comprises:
       determining, by the processing module, whether an ambient light intensity obtained by the light sensing element is greater than a threshold to serve as the required condition of whether to activate the auxiliary illumination light;
       determining, by the processing module, whether the ambient light intensity reaches within a range of a sensing interval to serve as the required condition of whether to activate the auxiliary illumination light;
    activating, by the processing module, the auxiliary illumination light and displaying, by the display screen, current lighting intensity information of the light-emitting module when the ambient light intensity does not reach within the range of the sensing interval; and
    turning off, by the processing module, the auxiliary illumination light when the ambient light intensity reaches within the range of the sensing interval;
    determining, by the processing module, whether electrical energy of the electronic device is provided by a battery or a power plug;
    when the electrical energy is provided by the power plug in a current power supply status, adjusting, by the processing module, the auxiliary illumination light dynamically based on a distance between a user and the first body, comprising:
       adjusting, by the processing module, a brightness of the auxiliary illumination light to be greater when the distance is relatively long; and
       adjusting, by the processing module, the brightness of the auxiliary illumination light to be less when the distance is relatively short,
    wherein the display screen is a touch display screen; and
    correspondingly changing brightness of a portion of the light-emitting module extended along a first direction in the border area according to adjustment of a first virtual adjustment button displayed on the touch display screen, wherein a position of the first virtual adjustment button is adapted to be correspondingly adjusted in the first direction according to a touch gesture; or
    correspondingly changing brightness of a portion of the light-emitting module extended along a second direction in the border area according to adjustment of a second virtual adjustment button displayed on the touch display screen, wherein a position of the second virtual adjustment button is adapted to be correspondingly adjusted in the second direction according to another touch gesture.

13. The operation method as described in claim 12, further comprising:
    driving, by the processing module, the display screen to display an adjustment interface; and
    taking, by the processing module, a setting result corresponding to the adjustment interface as the required condition for activating the auxiliary illumination light.

14. The operation method as described in claim 12, wherein the electronic device further comprises a second body, the second body has one side pivotally connected to one side of the first body, and the second body comprises a switch unit, and wherein the operation method further comprises:
    providing, by the switch unit, an enable signal; and
    taking, by the processing module, the enable signal as the required condition for activating the auxiliary illumination light.

15. The operation method as described in claim 12, wherein the electronic device further comprises a second body, and the second body has one side pivotally connected to one side of the first body, and comprises at least two adjustment units, and wherein the operation method further comprises:
- providing, by the at least two adjustment units, at least two adjustment signals; and
- adjusting, by the processing module, brightness of the auxiliary illumination light provided by the light-emitting module according to the at least two adjustment signals.

16. The operation method as described in claim 12, wherein the operation method further comprises:
- dynamically adjusting, by the processing module, an auxiliary illumination light provided by the light-emitting module according to battery charge information provided by a battery control unit.

* * * * *